(12) United States Patent
Noji et al.

(10) Patent No.: US 10,387,529 B2
(45) Date of Patent: Aug. 20, 2019

(54) PARAPHRASING TEXT IN A WEBPAGE

(71) Applicant: International Business Machines Corporation, Armonk, NY (US)

(72) Inventors: Kentaroh Noji, Yokohama (JP); Akihiko Takajo, Kanagawa (JP); Yukiko Yasuda, Tokyo (JP)

(73) Assignee: International Businesss Machines Corporation, Armonk, NY (US)

(*) Notice: Subject to any disclaimer, the term of this patent is extended or adjusted under 35 U.S.C. 154(b) by 86 days.

(21) Appl. No.: 15/434,225

(22) Filed: Feb. 16, 2017

(65) Prior Publication Data

US 2018/0232347 A1 Aug. 16, 2018

(51) Int. Cl.
*G06F 17/00* (2019.01)
*G06F 16/958* (2019.01)

(52) U.S. Cl.
CPC .................................. *G06F 16/958* (2019.01)

(58) Field of Classification Search
CPC ..................... G06F 17/30616; G06F 17/30669
See application file for complete search history.

(56) References Cited

U.S. PATENT DOCUMENTS

| 8,020,094 | B2 | 9/2011 | Mohan | |
|---|---|---|---|---|
| 2005/0229101 | A1 | 10/2005 | Matveyenko et al. | |
| 2009/0192783 | A1* | 7/2009 | Jurach, Jr. | G06F 17/2827 704/4 |
| 2010/0083102 | A1 | 4/2010 | Jimenez et al. | |
| 2011/0113320 | A1* | 5/2011 | Neff | G06Q 10/10 715/230 |
| 2011/0172987 | A1* | 7/2011 | Kent | G06F 17/241 704/3 |
| 2012/0331379 | A1* | 12/2012 | Carro | G06F 9/543 715/243 |
| 2014/0304839 | A1* | 10/2014 | Hansen | G06F 21/6209 726/29 |

FOREIGN PATENT DOCUMENTS

| JP | 2005310163 A | 11/2005 |
|---|---|---|
| JP | 2009181539 A | 8/2009 |
| JP | 2009545077 A | 12/2009 |

* cited by examiner

*Primary Examiner* — Andrew T McIntosh
(74) *Attorney, Agent, or Firm* — William H. Hartwell; Hunter E. Webb; Keohane & D'Alessandro, PLLC

(57) ABSTRACT

The present invention may be a method, a system, and/or a computer program product. An embodiment of the present invention provides a method for paraphrasing, on a client computer, text in a webpage, the method comprising the following: transferring a request for a webpage including a plurality of passages of text to a server; receiving the webpage from the server in response to the request; judging whether or not the received webpage has text which is a subject of paraphrase; in a case where the judgment is positive, paraphrasing the text; and displaying, on a display, the webpage including the paraphrased text. Another embodiment of the present invention provides a method for updating on a server, text in a webpage, the method comprising the following: receiving, from each of the devices, a set of URLs of a webpage, a location path of text which is a subject of paraphrase in the webpage, and paraphrased text; and replacing text in the webpage with text among the received text.

17 Claims, 18 Drawing Sheets

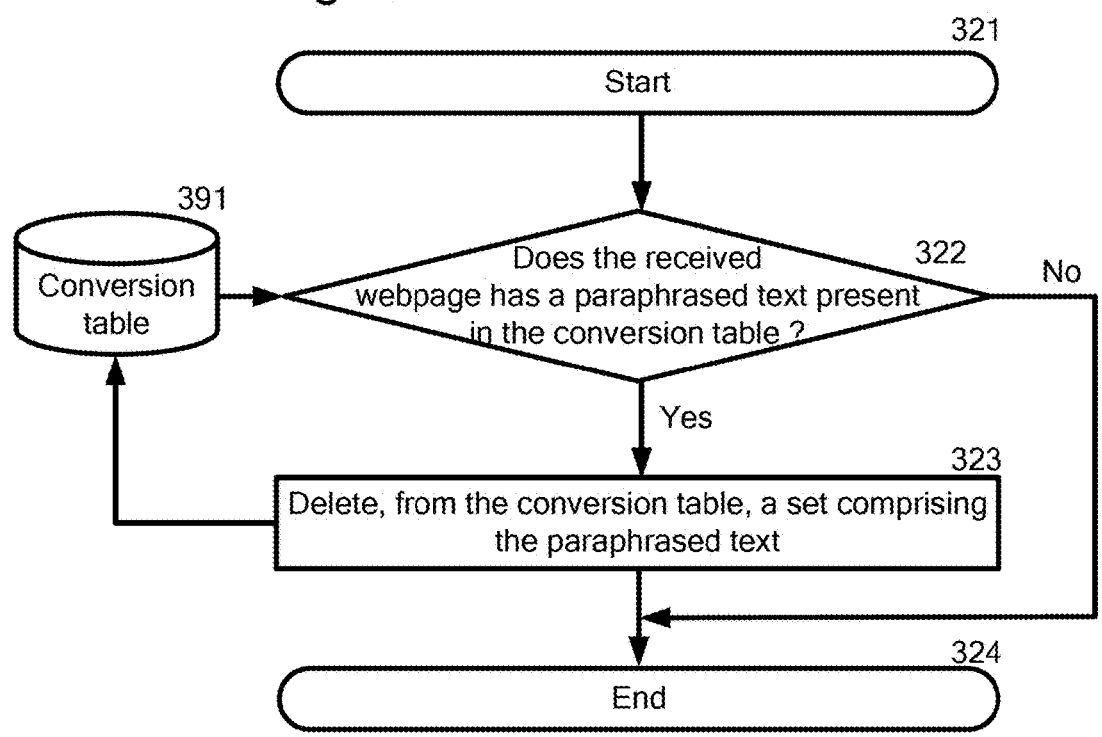

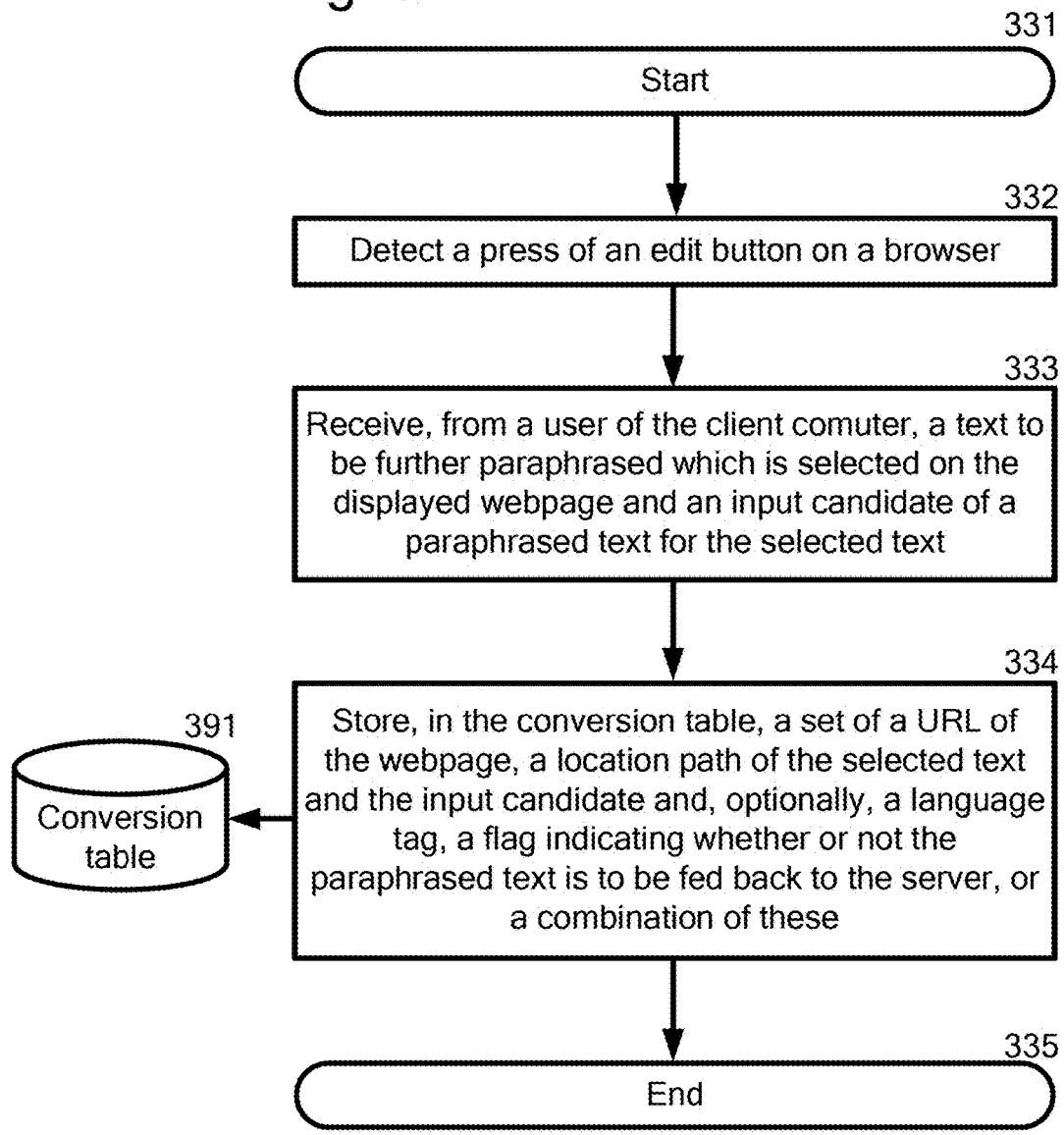

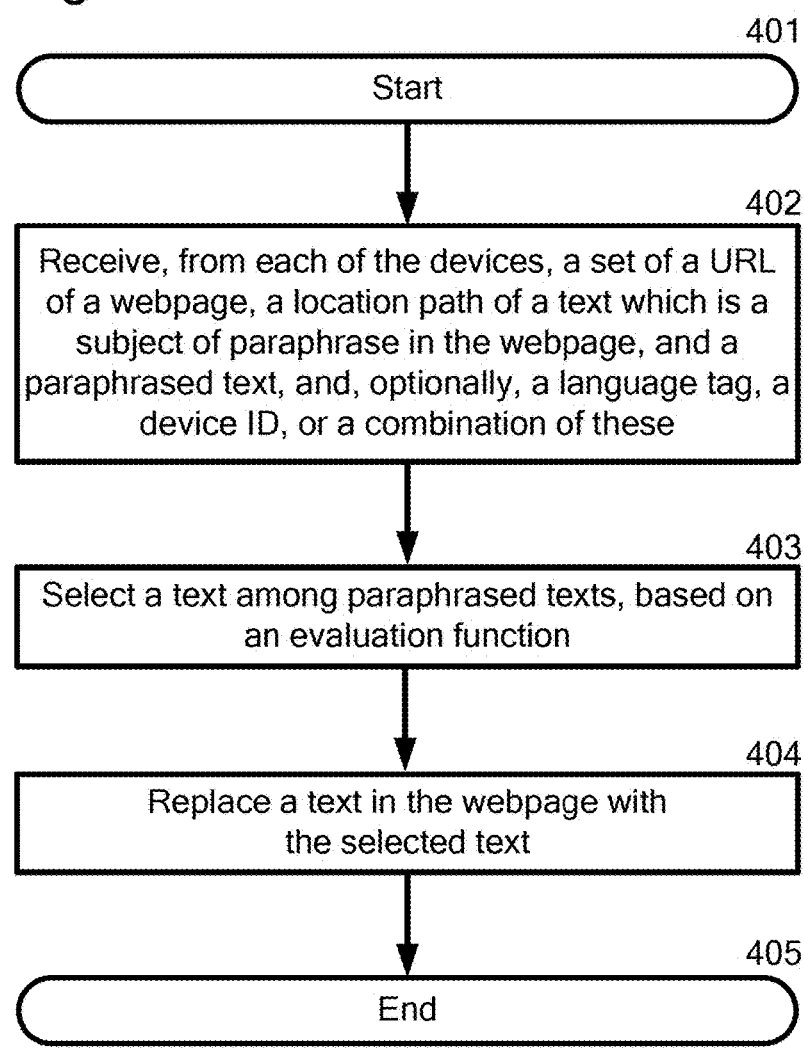

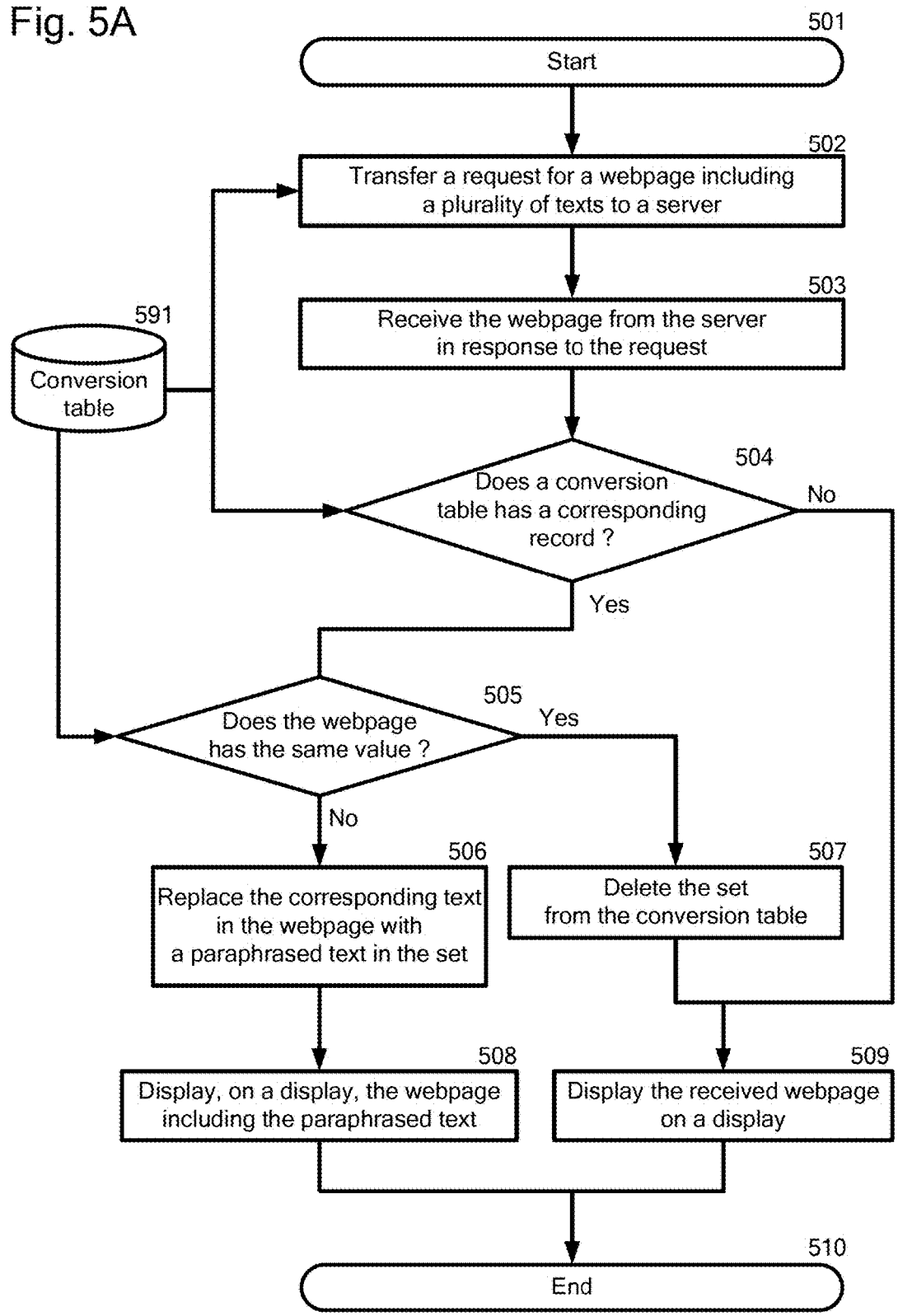

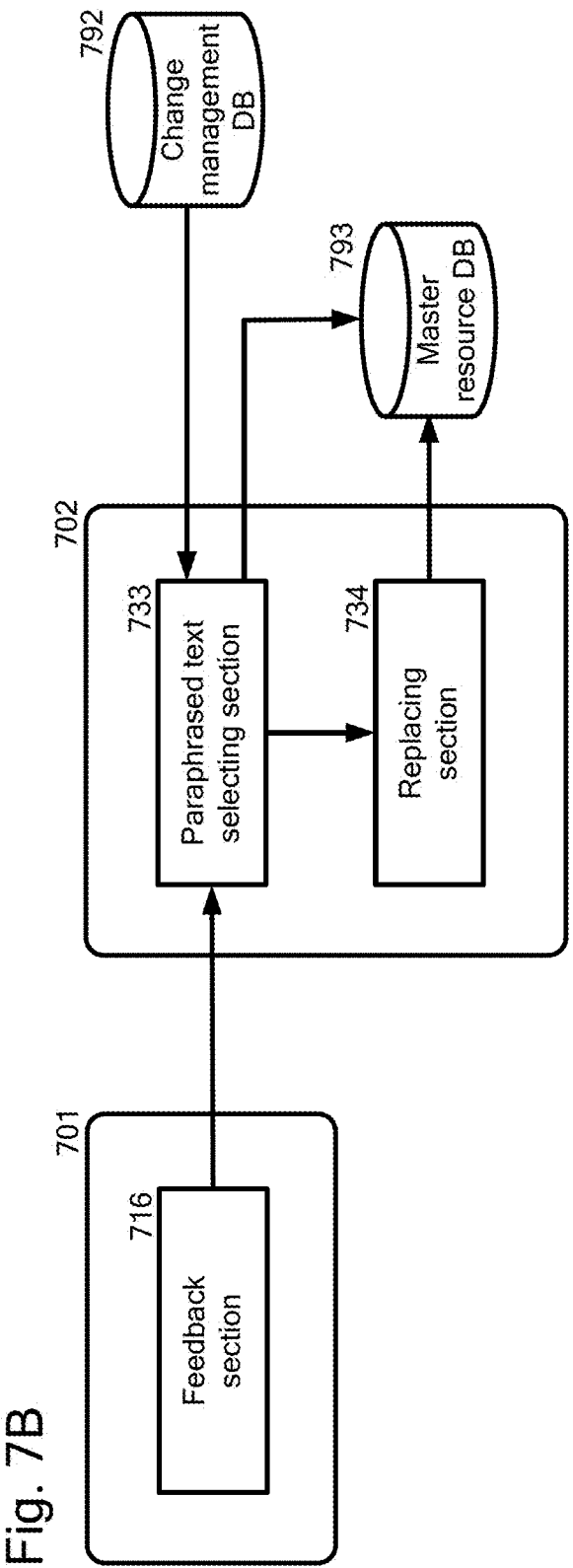

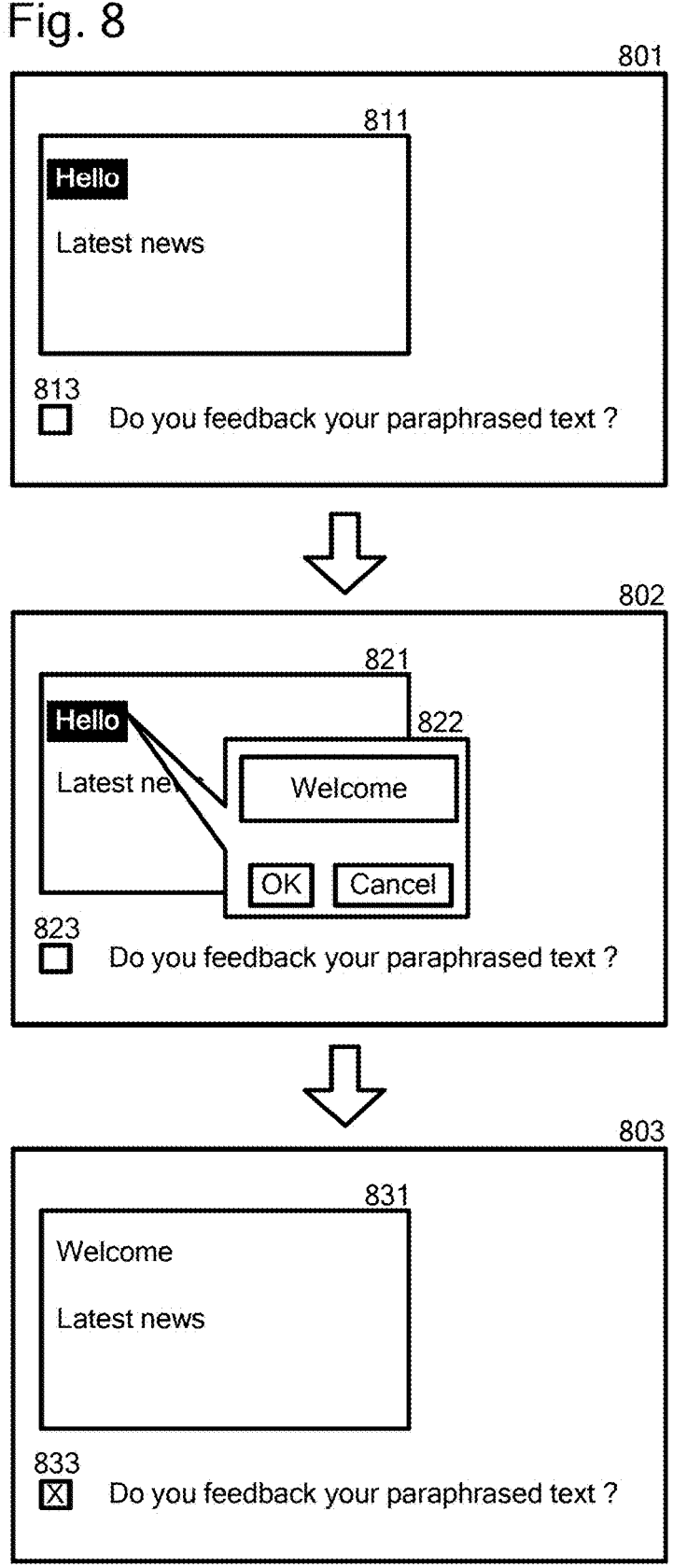

PARAPHRASING TEXT IN A WEBPAGE

BACKGROUND

The present invention relates to a technique for paraphrasing, on a client computer, text in a webpage. The present invention also relates to a technique for updating, on a server, the text in the webpage.

Text displayed on a screen of a web application is generally managed integrally by a server as a part its of resources and, in normal cases, cannot be freely edited by individual users. In some cases, however, it would be preferable for the text to be changed in accordance with preferences of a company or a user. To accomplish this, the resources stored in the server currently need to be edited directly, even though the changes may affect all users. Alternatively, a different resource must be stored in the server for the edits corresponding to each user.

SUMMARY

According to one aspect of an embodiment of the present invention, the embodiment of the present invention provides a method for paraphrasing, on a client computer, text in a webpage. The method comprises the following: transferring a request for a webpage including a plurality of passages of text to a server; receiving the webpage from the server in response to the request; judging whether or not the received webpage has text which is a subject of paraphrase; in a case where the judgment is positive, paraphrasing the text; and displaying, on a display, the webpage including the paraphrased text.

According to another aspect of an embodiment of the present invention, the embodiment of the present invention provides a method for updating, on a server which is connected to the device according to one aspect of an embodiment of the present invention, text in a webpage. The method comprises the following: receiving, from each of the devices, a set of URLs of a webpage, a location path of text which is a subject of paraphrase in the webpage, and paraphrased text; and replacing text in the webpage with text among the received text.

According to another aspect of the present invention, a system, such as a computer system, comprising a processor and a memory storing a program of instructions executable by the processor to perform one or more methods described herein may be provided.

According to another aspect of the present invention, a computer program product comprising a computer readable storage medium storing a program of instructions executable by a system to perform one or more methods described herein also may be provided.

BRIEF DESCRIPTION OF THE DRAWINGS

The disclosure will provide details in the following description of preferred embodiments with reference to the following figures.

FIG. 3C illustrates one embodiment of a flowchart of a process for deleting, on a client computer, a set comprising the paraphrased text from the conversion table.

FIG. 3D illustrates one embodiment of a flowchart of a process for receiving, from a user of the client computer, text to be further paraphrased.

FIG. 4 illustrates one embodiment of a flowchart of a process for replacing, on the server, text in the webpage with all or a portion of the paraphrased text received from each client computer.

FIG. 5A illustrates another embodiment of a flowchart of a process for paraphrasing, on a client computer, text in a webpage received from a server, and deleting a set comprising the paraphrased text from the conversion table.

FIG. 7B illustrates an embodiment of an overall functional block diagram of a client computer and a server, both of which are used in accordance with the embodiment of the flowchart described in FIGS. 3B and 4 and FIGS. 5C and 6.

FIG. 8 illustrates an embodiment of a user interface for selecting text in a webpage and inputting a candidate of paraphrased text.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

To define more clearly the terms used herein, the following exemplified definitions are provided, but the meaning of the terms should be interpreted broadly as known to the technical field to which the present invention relates.

The term, "paraphrase", refers to a restatement of the meaning of a text-based word, phrase, sentence, paragraph, or other passage using other words. The paraphrasing may include substitution within one language and/or substitution between different languages.

The term, "a webpage", refers to a document that is suitable for the World Wide Web and to be viewed using a web application such as a web browser. Any web browser now known or later developed in the art can be used in an embodiment of the present invention. The web application may display a webpage on a client computer.

The term, "a client computer" or "a client", refers to any device that can display a webpage on a display.

The term, "a server", refers to any computer that can provide a webpage to a client computer in response to the request for transferring a webpage from the client computer.

Figure 1A:
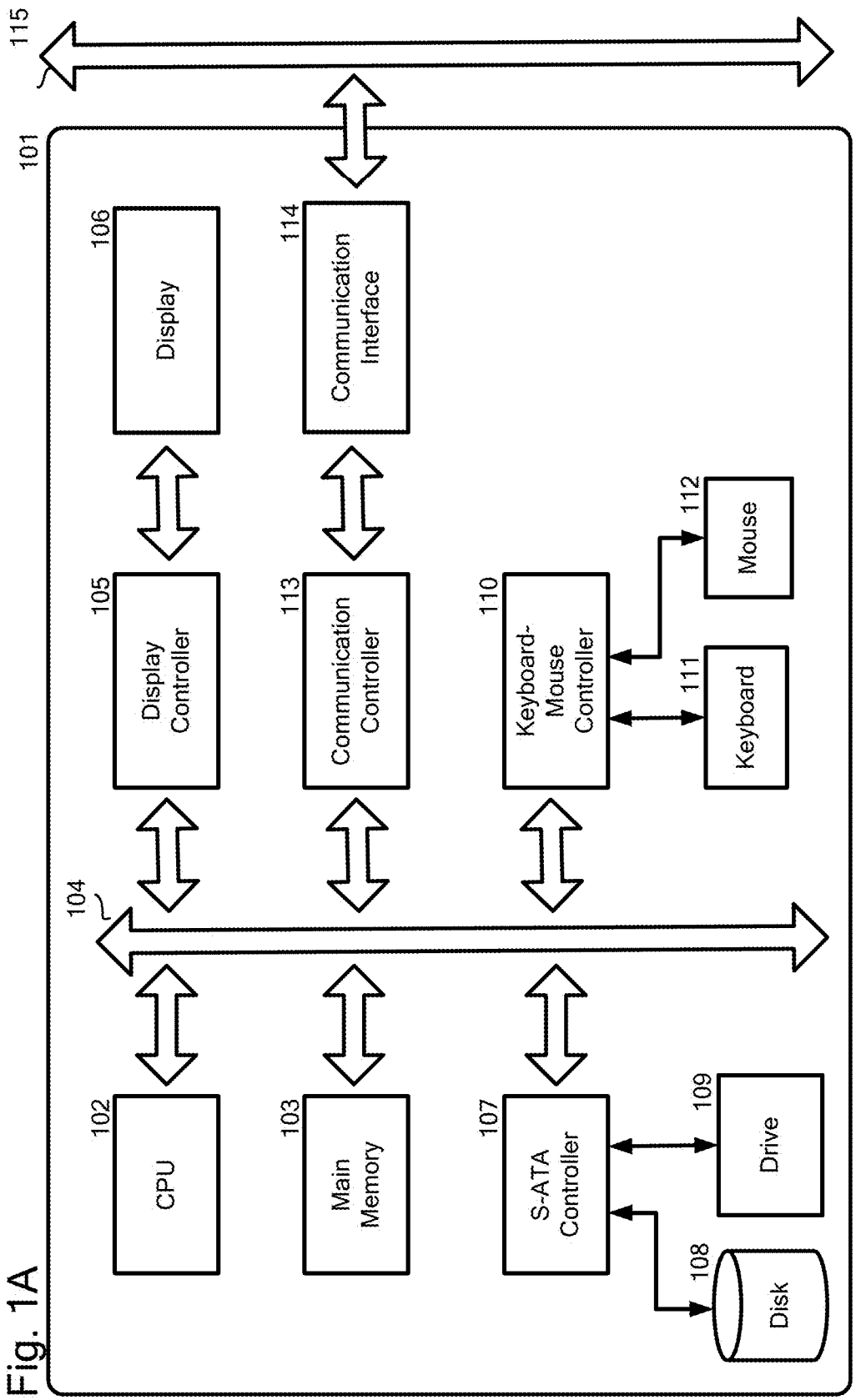
FIG. 1A illustrates an exemplified basic block diagram of a client computer's hardware used in an embodiment of the present invention.

With reference now to FIG. 1A, FIG. 1A illustrates an exemplified basic block diagram of a client computer's hardware used in an embodiment of the present invention.

A client 101 may be, for example, but is not limited to, a desktop, a laptop, or a notebook computer; a thin client; a tablet; a smart phone; a mobile phone; a game terminal; or an internet television. Client 101 may comprise one or more CPUs 102 and a main memory 103 connected to a bus 104.

Bus 104 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A display 106 such as a liquid crystal display (LCD) may be connected to bus 104 via a display controller 105. Display 106 may be used to display, for management of the computer(s), information on a computer connected to a network via a communication line and/or information on software running on the computer using an appropriate graphics interface. A disk 108 such as such as a hard disk, a solid state drive, SSD or other storage medium, and a drive 109 such as a CD, a DVD, or a BD (Blu-ray disk drive may be connected to bus 104 via an SATA or IDE controller 107. Moreover, a keyboard 111 and a mouse 112 may be connected to bus 104 via a keyboard-mouse controller 110 or USB bus (not shown).

An operating system, application programs, other programs, and any data may be stored in disk 108 to be loadable to the main memory. Drive 109 may be used to install a program, such as the computer program of an embodiment of the present invention, readable from a CD-ROM, a DVD-ROM, or a BD to disk 108 or to load any data readable from a CD-ROM, a DVD-ROM, or a BD into main memory 103 or disk 108, if necessary.

A communication interface 114 may be based on, for example, but is not limited to, the Ethernet® protocol. Communication interface 114 may be connected to bus 104 via a communication controller 113, physically connects client 101 to a communication line 115, and may provide a network interface layer to the TCP/IP communication protocol of a communication function of the operating system of client 101. In this case, communication line 115 may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Figure 1B:
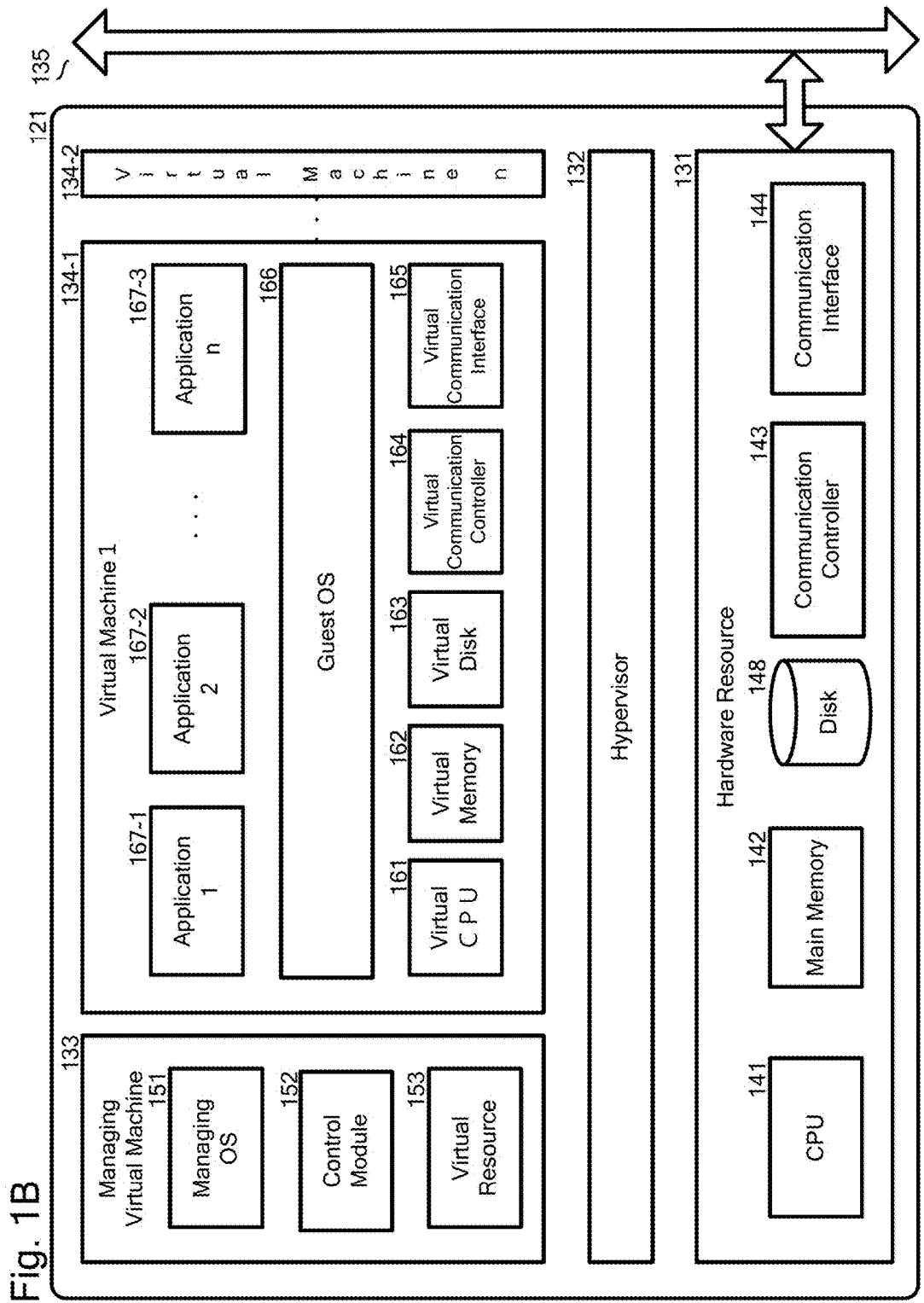
FIG. 1B illustrates an exemplified basic block diagram of a server hardware used in an embodiment of the present invention.

With reference now to FIG. 1B, a server 121 may be, for example, but is not limited to, a server hardware, such as a workstation, a rack-mount type server, a blade type server, or a mainframe server. Server 121 may comprise a hardware resource 131, a hypervisor 132, called a virtual machine monitor or a virtual operating system, a managing virtual machine 133, called a domain-0 or a parent partition, and one or more virtual machines 1 to n 134-1 to 134-2, called a domain-U or a child partition.

Hardware resource 131 may comprise one or more CPUs 141, a main memory 142, a disk 148 such as a hard disk, a solid state drive, SSD or other storage medium, a communication controller 143, and a communication interface 144. CPU 141, main memory 142, disk 148, communication controller 143, and communication interface 144 may correspond to CPU 102, main memory 103, \disk 108, communication controller 113, and communication interface 114 described in FIG. 1A, respectively.

Hypervisor 132 may, for example, be a part of computer software, firmware or hardware and may create and run one or more virtual machines. Hypervisor 132 may run directly on hardware resource 131 or, alternatively, may run on an operating system running on hardware resource 131. In the former case, hypervisor 132 may manage a guest operating system 166. Hypervisor 132 may be realized by, for example, but is not limited to, a virtual software, such as VMware®, Hyper-V®, or Xen®. ("VMware" is a registered trademark of VMware Inc. in the United States, other countries, or both; "Hyper-V" is a registered trademark of Microsoft corporation in the United States, other countries, or both; and "Xen" is a registered trademark of Citrix Systems, Inc. in the United States, other countries, or both).

Managing virtual machine 133 may comprise, for example, a managing operating system 151, a control module 152, and a virtual resource 153. Control module 152 may run on managing operating system 151 and may issue a command to hypervisor 132. Control module 152 may generate one or more virtual machines 1 to n 134-1, 134-2. Further, control module 152 may issue a boot command for guest operating system 156 and control an operation of virtual machine 1 to n 134-1 to 134-2. Virtual resource 153 may be a hardware resource assigned to managing virtual machine 133.

Server 121 may implement at least one of virtual machines 1 to n 134-1 to 134-2. Virtual machine 1 134-1 may comprise a virtual resource, for example, but is not limited to, a virtual CPU 161, a virtual memory 162, a virtual disk 163, a virtual communication controller 164 and/or a virtual communication interface 165. Further, virtual machine 1 134-1 may comprise, for example, but is not limited to, guest operating system 166 and one or more application(s) 1 to n 167-1 to 167-3.

Guest operating system 166, may run on virtual machine 1 134-1. The same applies also to other virtual machines, such as virtual machine n 134-2.

One or more applications 167-1, 167-2, and 167-3 may run on guest operating system 166. The computer program of an embodiment of the present invention may be implemented as one of applications 167-1, 167-2, and 167-3.

In an embodiment of the present invention, client 101 may be connected to virtual machine implemented on the server 121.

Hereinafter, embodiments of the present invention will be described with reference to the following FIGS. 2A to 2C, FIGS. 3A to 3D, FIG. 4, FIGS. 5A to 5C, FIG. 6, FIGS. 7A to 7C and FIG. 8.

Figure 2A:
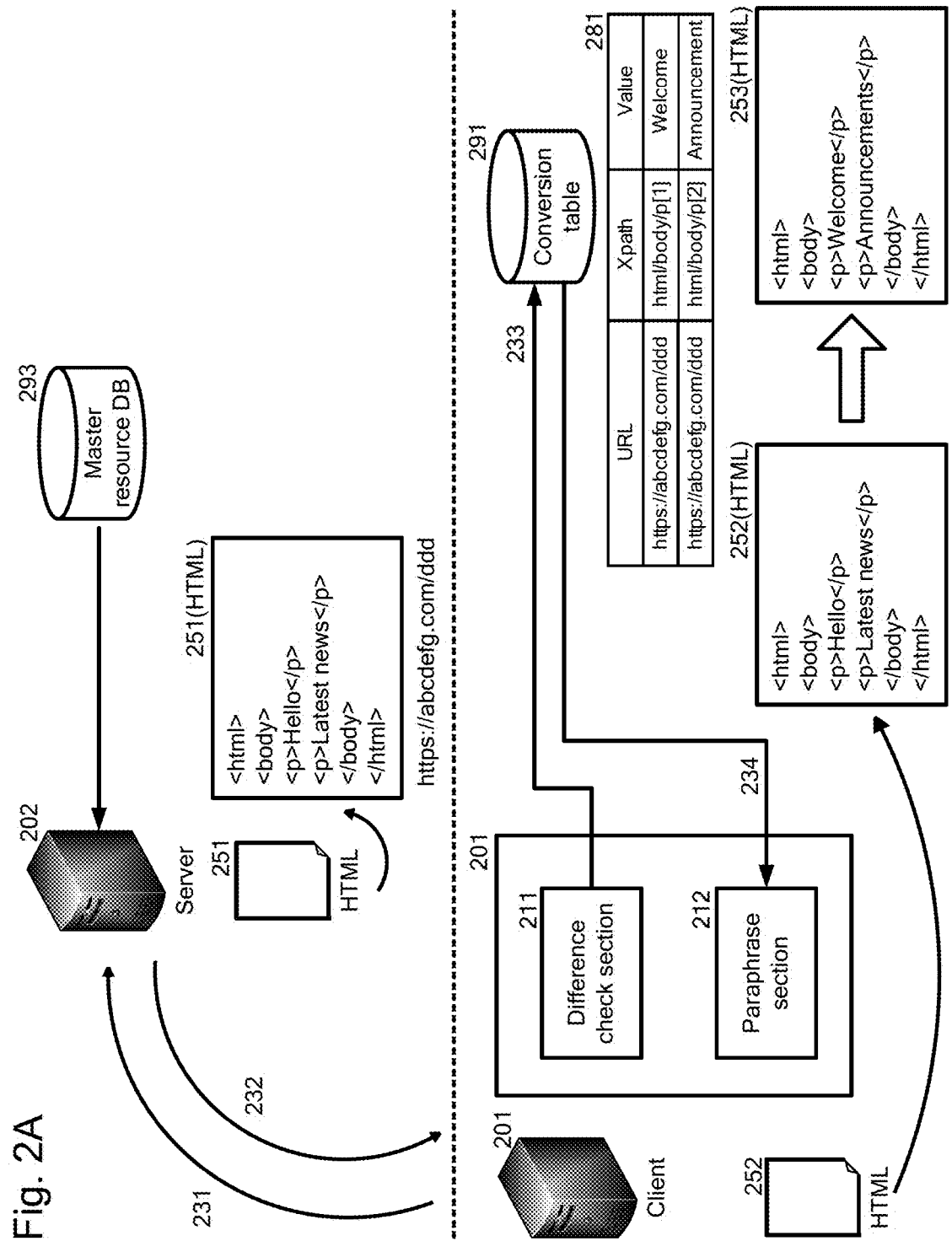
FIG. 2A illustrates an embodiment of a diagram of paraphrasing, on a client computer, text in a webpage received from a server.
Figure 2B:
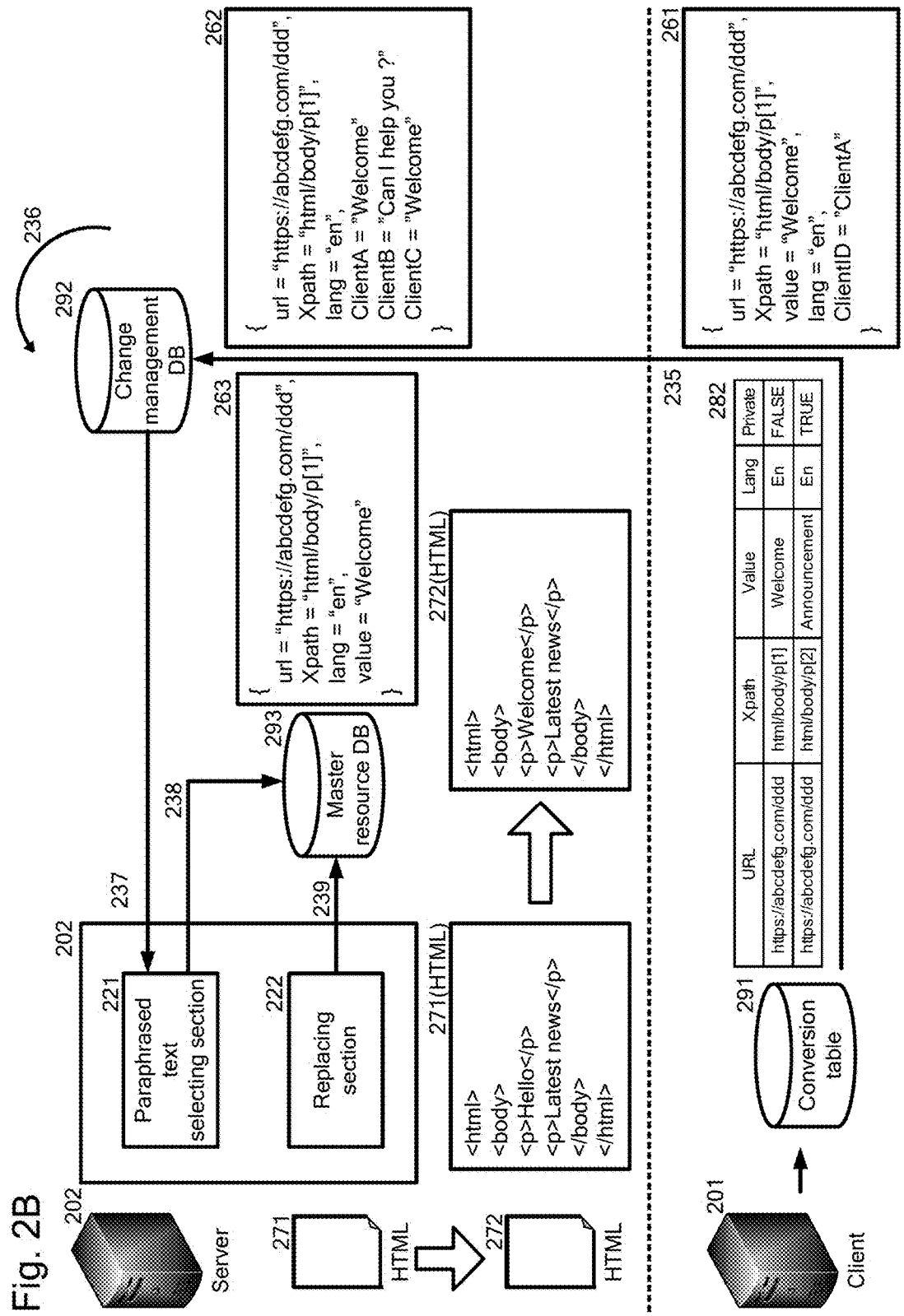
FIG. 2B illustrates an embodiment of a diagram of feedbacking the paraphrased text from the client computer to the server, and replacing text in the webpage with all or a portion of the paraphrased text received from each client computer.
Figure 2C:
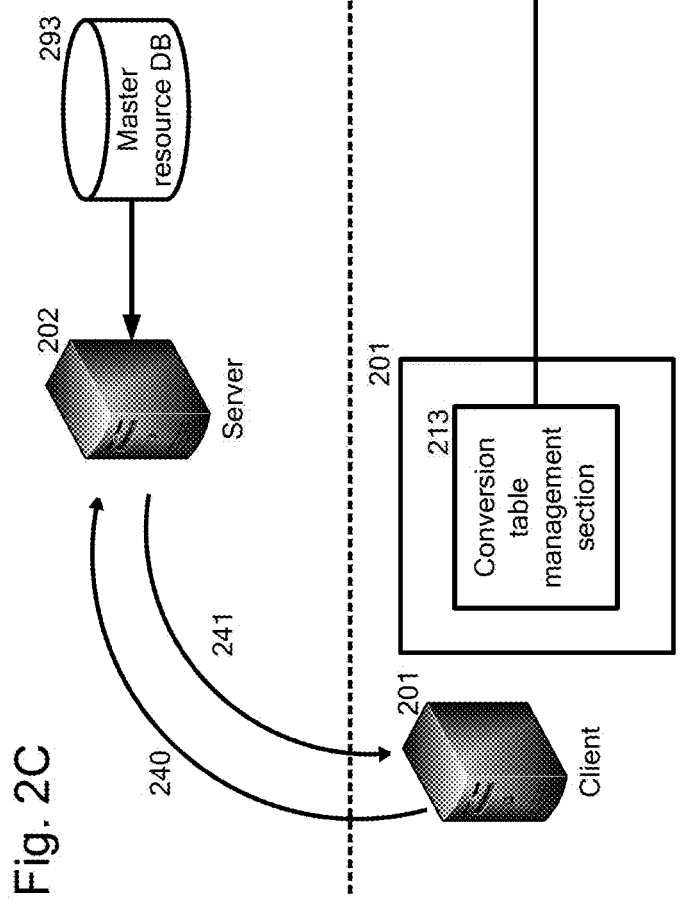
FIG. 2C illustrates an embodiment of a diagram of deleting, on a client computer, a set comprising the paraphrased text from the conversion table.
Figure 5B:
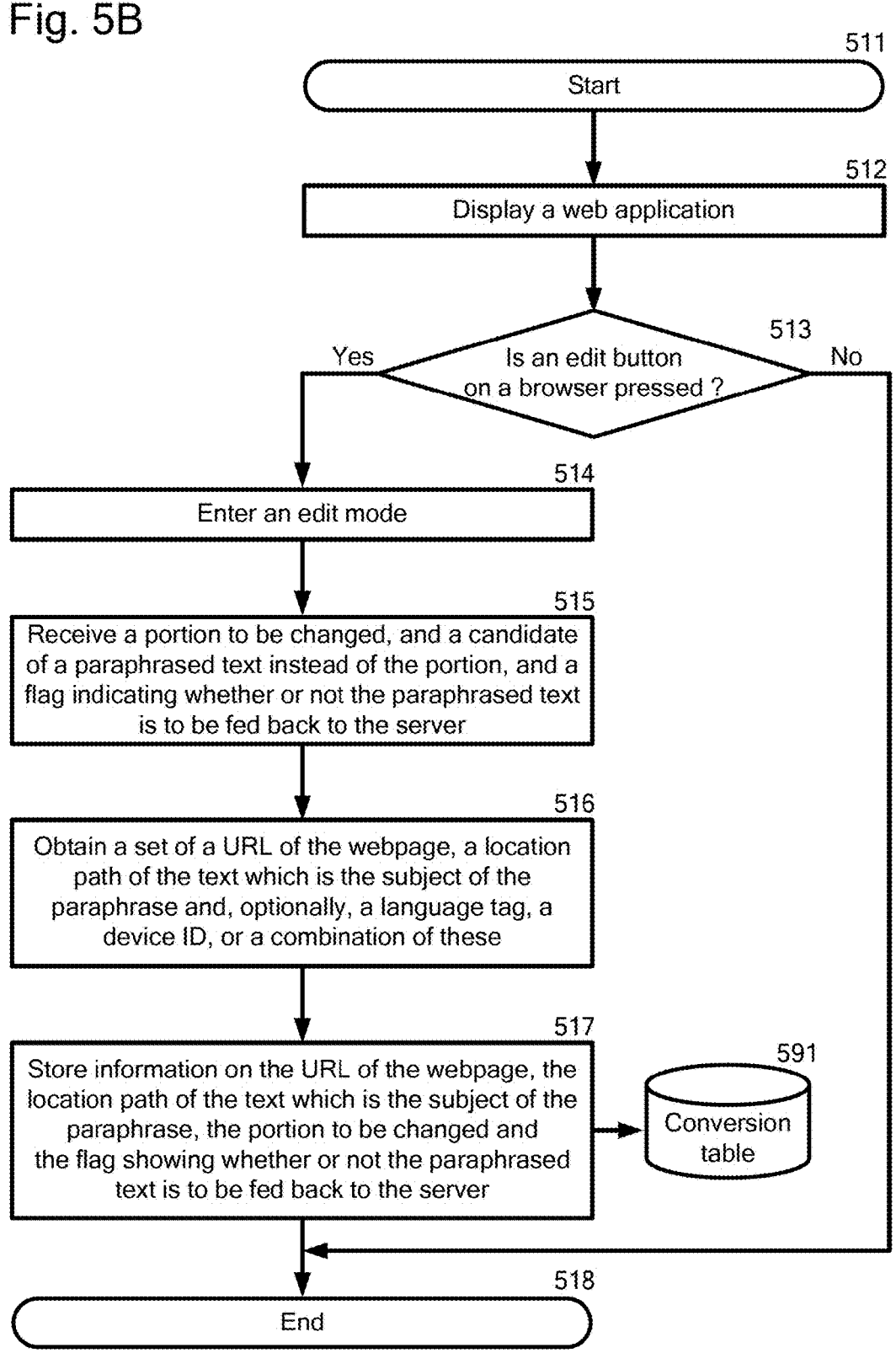
FIG. 5B illustrates another embodiment of a flowchart of a process for receiving, from a user of the client computer, text to be further paraphrased.
Figure 5C:
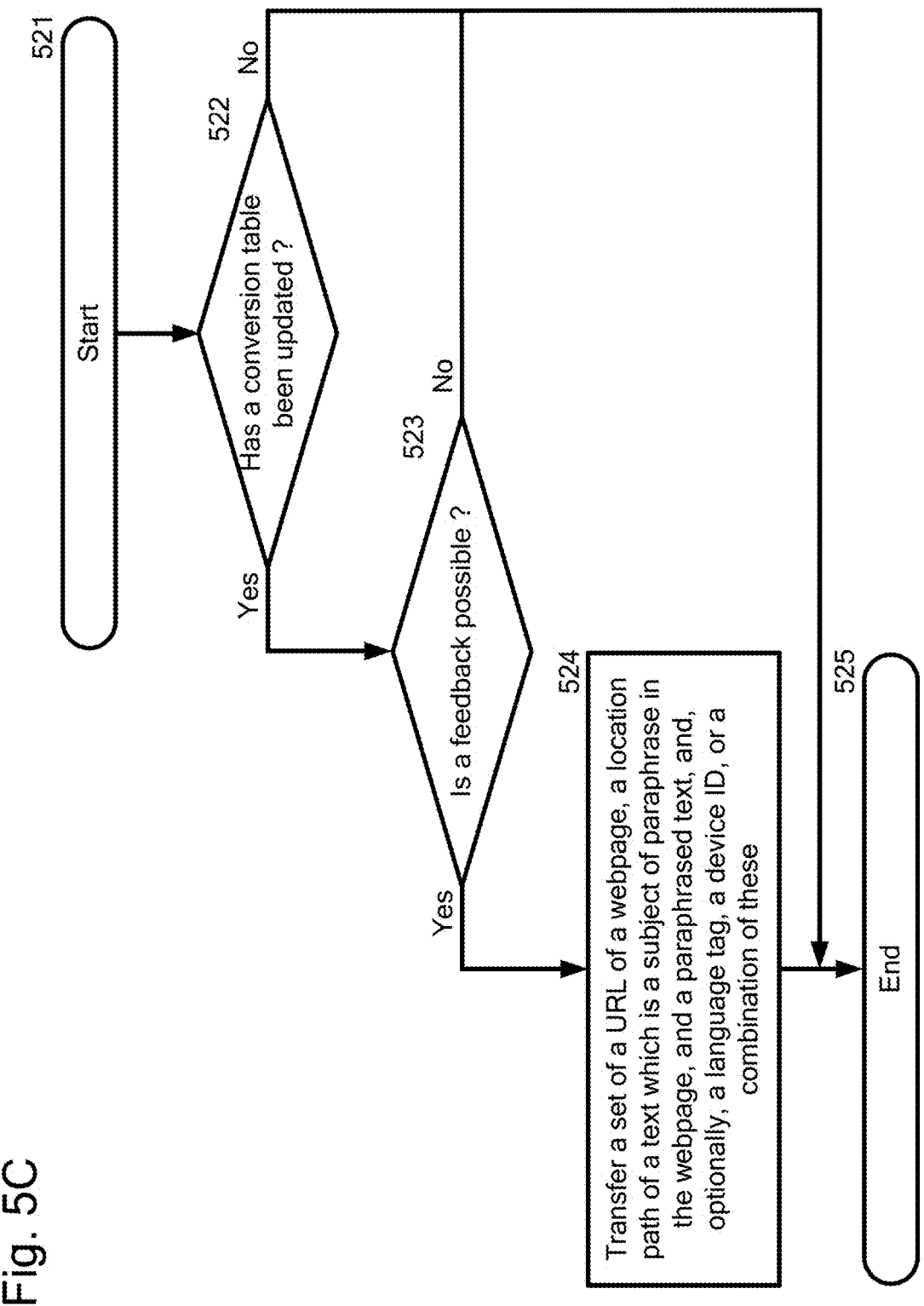
FIG. 5C illustrates another embodiment of a flowchart of a process for feedbacking the paraphrased text from the client computer to the server.
Figure 6:
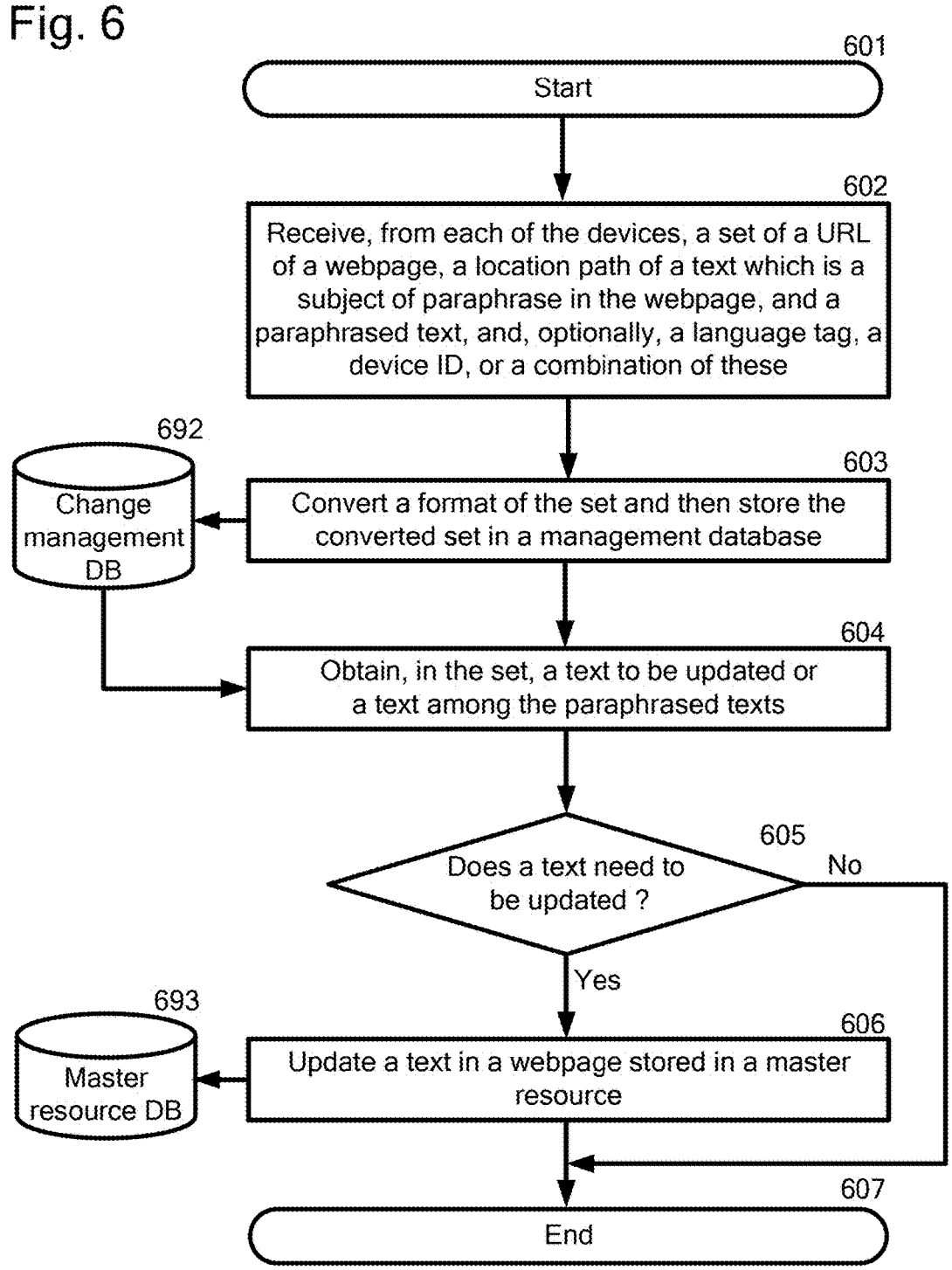
FIG. 6 illustrates another embodiment of a flowchart of a process for replacing, on the server, text in the webpage with all or a portion of the paraphrased text received from each client computer.

An embodiment of the present invention will be first explained by referring to FIGS. 2A to 2C in which a diagram of paraphrasing, on a client computer, text in a webpage and related diagrams is illustrated and then explained two different embodiments of flowcharts of a process for the paraphrase by referring to FIGS. 3A to 3D together with FIG. 4 and FIGS. 5A to 5C together with FIG. 6.

FIGS. 2A to 2C illustrate an embodiment of a diagram of paraphrasing, on a client computer, text in a webpage and related diagrams.

A client 201 such as the client 101 described in FIG. 1A can perform one or more of the steps described in each of FIGS. 2A to 2C. A server 202 such as the server 121 described in FIG. 1B can perform one or more of the steps described in each of FIGS. 2A to 2C.

With reference now to FIG. 2A, FIG. 2A illustrates an embodiment of a diagram of paraphrasing text in a webpage received from a server.

At step 231, client 201 transfers a request for a webpage including a plurality of passages of text to server 202. The request may comprise the following URL, https://abcdefg-.com/ddd, which is comprised in a URL in any of the sets stored in a conversion table 291. A table 281 illustrates an example of sets stored in the conversion table 281. The table 281 shows the following: "url" as a URL of the webpage; "Xpath" as a location path of text which is a subject of paraphrase in the webpage; and "value" as paraphrased text.

At step 232, server 202 searches for a requested webpage or HTML 251 and then sends the requested webpage to client 201. An example of the requested webpage is illustrated in a table 251 (HTML). The HTML shown in the table 251 (HTML) is only for a purpose of explaining an embodiment of the present invention. Let us suppose that the HTML shown in the table 251 (HTML) has two passages of text, "Hello" and "Latest news".

In response to the request, client 201 receives the webpage from server 202.

At step 233, prior to a display of the received webpage, client 201 judges, by referring to conversion table 291, whether or not received webpage 252 has text which is a subject of paraphrase in any of the sets stored in a conversion table 291. The judgment may be made using a difference check section 211 comprised in client 201.

Conversion table 291 has two sets described in a table 281, where each set comprises the following: "URL" corresponding to a URL of the webpage; "Xpath" corresponding to a location path of the text that is the subject of the paraphrase; and "Value" corresponding to the paraphrased text.

The HTML 251 comprises text specified by the Xpath, "html/body/p[I]" and text specified by the Xpath, "html/body/p[2]". Accordingly, client 201 judges that the received webpage has two passages of text each of which is a subject of paraphrase (or the judgment is positive).

At step 234, in response to the positive judgment, client 201 replaces the text in the passages, "Hello" and "Latest news", with the values, "Welcome" and "Announcement", respectively, in the sets stored in the conversion table 291. Accordingly, these passages of text have been paraphrased. The paraphrase may be made using a paraphrase section 212.

As a result, HTML 253 (HTML) is generated from HTML 252 (HTML) after the paraphrase.

Finally, client 201 displays, on a display, such as display 106 described in FIG. 1A, the webpage including the paraphrased text, "Welcome" and "Announcements".

With reference now to FIG. 2B, FIG. 2B illustrates an embodiment of a diagram of feedbacking the paraphrased text from the client to the server, and replacing, on the server, text in the webpage with text among the paraphrased text received from each client.

At step 235, client 201 refers to conversion table 291 and then detects a flag indicating whether or not the paraphrased text is to be fed back to the server. The flag may correspond to an item, "Private".

In a case where "Private" in a first line in a table 282 in the conversion table 291 is "FALSE", client 201 judges that the value or paraphrased text, "Welcome", is fed back to server 202. This is because a user of client 201 allows a feedback of the value to server 202.

In a case where "Private" in a second line in the table 282 in the conversion table 291 is "TRUE", client 201 judges that the value or paraphrased text, "Welcome", is not be fed backed to server 202. This is because a user of client 201 does not wish to feedback the value to server 202.

In a case in which the flag shows that the value or paraphrased text, "Welcome", is fed back to server 202, client transfers a set of URLss of the webpage, a location path of the text which is the subject of the paraphrase, the paraphrased text and, optionally, a language tag, a device ID, or a combination of these (see table 261). A table 261 illustrates an example of the transferred data to server 202. In table 261, the transferred data may be written in an XML format. Table 261 shows the following: "url" as a URL of the webpage; "Xpath" as a location path of text which is a subject of paraphrase in the webpage; "value" as paraphrased text; "Lang" as a language tag; and "Client ID" as a device ID.

The set may be stored in a change management database 292.

At step 236, a plurality of sets are transferred from a plurality of clients and then stored in the change management database 292.

At step 237, server 202 refers to change management database 292 and then collects the paraphrased text for each of the same URL and the same Xpath. A table 262 illustrates an example of the collected paraphrased text. Table 262 shows the following: "url" as a URL of the webpage; "Xpath" as a location path of text which is a subject of paraphrase in the webpage; "lang" as a language tag; and "ClientA", "ClientB" and "ClientC" as device IDs from which each of "value" as paraphrased text were sent.

The server then selects text among the paraphrased text, based on an evaluation function. The evaluation function may be one mentioned above. The selection may be made using paraphrased text selecting section 221 comprised in server 202.

A table 263 illustrates an example of the selected paraphrased text among the paraphrased text. Table 263 shows the following: "url" as a URL of the webpage; "Xpath" as a location path of text which is a subject of paraphrase in the webpage; "lang" as a language tag; and "value" as the selected paraphrased text.

At step 238, server 202 judges whether or not corresponding text in the webpage is to be replaced with the selected paraphrased text. The judgment is made by referring to a master resource database 293 to decide that text in a master HTML (or a master resource) has a different value compared to that in the value as seen in table 263.

At step 239, in a case where text in a master HTML 271 stored in master resource database 293 has a different value compared to that in the value as seen in table 263, server 202 replaces the text in master HTML 271 with the selected paraphrased text to generate an updated HTML comprising selected paraphrased text 272. The replacement may be made using a replacing section 222 comprised in server 202.

A table 271 (HTML) illustrates an example of a master HTML 271 before the replacement mentioned above.

A table 272 (HTML) illustrates an example of a new master HTML 272 after the replacement mentioned above.

Comparing table 272 with table 271, a value, "Hello", which is specified by a first tag set <p> and </p> are replaced with the paraphrased text, "Welcome".

Accordingly, new HTML 272 comprising the paraphrased text is stored, as a master resource, in master resource database 293.

With reference now to FIG. 2C, FIG. 2C illustrates an embodiment of a diagram of deleting, on a client computer, a set comprising the paraphrased text from the conversion table.

At step 240, client 201 transfers a request for a webpage including a plurality of passages of text to server 202. The request may comprise the following URL, https://abcdefg.com/ddd, which is comprised in a URL in any of the sets stored in a conversion table 291.

At step 241, server 202 searches for a requested webpage or HTML 251 and then sends the requested webpage to client 201.

In response to the request, client 201 receives the webpage from server 202.

At step 242, prior to a display of the received webpage, client 201 judges, by referring to conversion table 291, whether or not received webpage 252 has text which is a subject of paraphrase in any of the sets stored in a conversion table 291. The judgment may be made using a difference check section 211 comprised in client 201.

Conversion table 291 has two sets described in a table 283 corresponding to table 282 described in FIG. 2B, where each set comprises the following: "URL" corresponding to a URL of the webpage; "Xpath" corresponding to a location path of the text which is the subject of the paraphrase; "Value" corresponding to the paraphrased text; "Lang" as a language tag; and "Private" corresponding to a flag indicating whether or not the paraphrased text is to be fed back to the server.

Client 201 then finds that the value or paraphrased text in the table 283 is the same as text in the HTML, where this text is specified by the corresponding URL and Xpath in the table 283.

The client deletes a set comprising the value, "Welcome", from the conversion table 291.

A table 284 illustrates a set stored in the conversion table 291 after the deletion of the set comprising the value, "Welcome". Accordingly, table 283 can be updated as seen in table 284 and then stored in conversion table 291.

FIGS. 3A to 3D illustrate one embodiment of a flowchart of a process for paraphrasing, on a client computer, using conversion table, text in a webpage and related processes.

Client 101 described in FIG. 1A performs one or more of the steps described in each of FIGS. 3A to 3D.

Figure 3A:
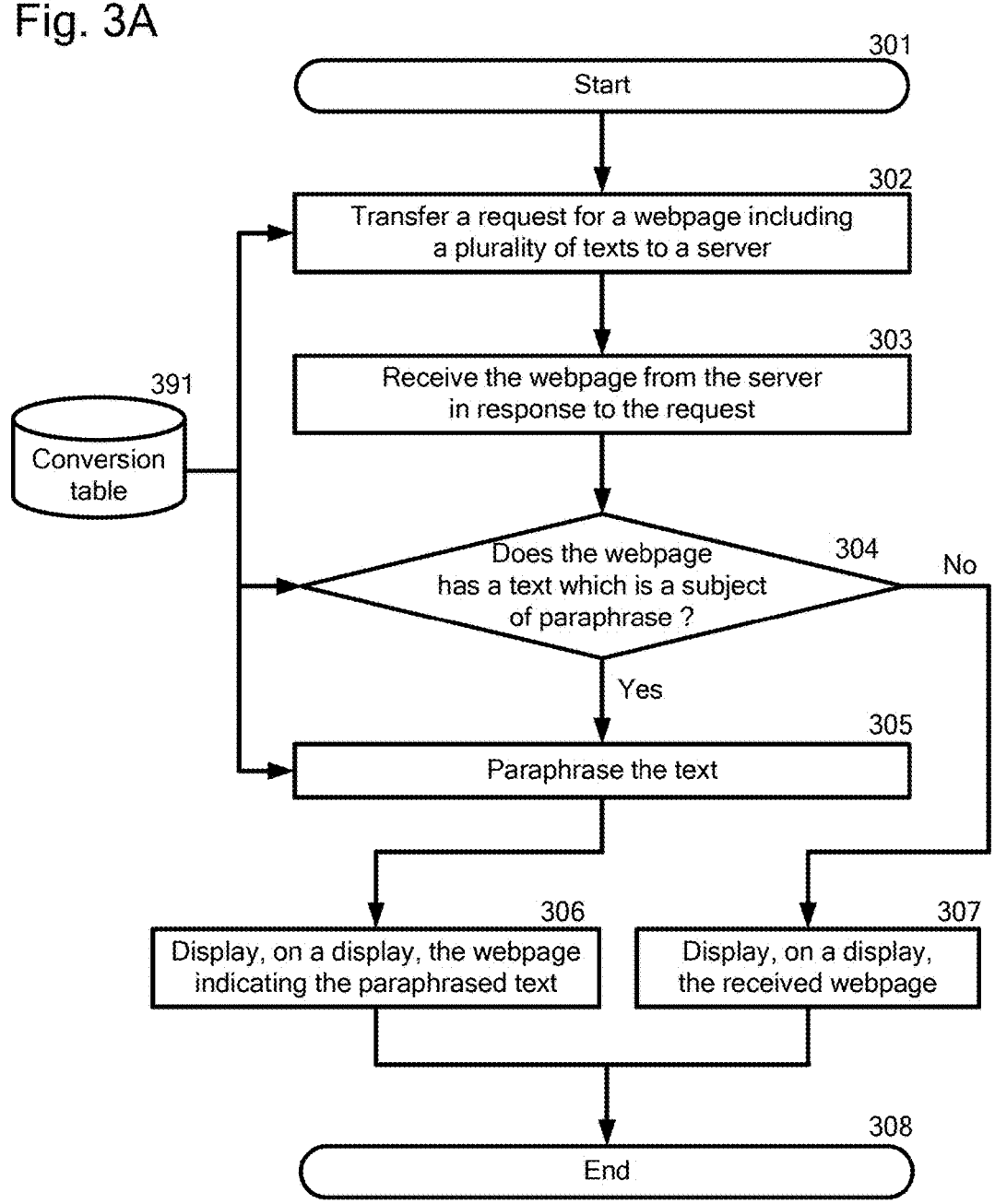
FIG. 3A illustrates one embodiment of a flowchart of a process for paraphrasing, on a client computer, text in a webpage received from a server.

With reference now to FIG. 3A, FIG. 3A illustrates one embodiment of a flowchart of a process for paraphrasing, on a client computer, using conversion table, text in a webpage received from a server.

At step 301, the client starts the process for paraphrasing, using conversion table, text in a webpage received from a server.

At step 302, the client transfers a request for a webpage including a plurality of passages of text to a server. The request may comprise a URL stored in a conversation table 391. Conversion table 391 may comprise at least one set of a URL of a webpage, a location path of text which is a subject of paraphrase in the webpage, and paraphrased text.

At step 303, the client receives the webpage from the server in response to the request.

At step 304, prior to a display of the received webpage, the client judges whether or not the received webpage has text which is a subject of paraphrase. The judging may be made by referring to conversion table 391.

If the judgment is positive, the client proceeds to step 305. Meanwhile, if the judgment is negative, the client proceeds to a final step 307.

At step 305, the client paraphrases the text. The paraphrasing may be made by referring to conversion table 391. The paraphrasing may be substitution within one language or substitution between different languages.

At step 306, the client displays, on a display, the webpage including the paraphrased text instead of displaying the received webpage.

At step 307, the client displays, on a display, the received webpage.

At step 308, the client terminates the process mentioned above.

According to the embodiment described in FIG. 3A, it is not necessary to store, in a server, a respective resource for each of users, because each client can paraphrase text in a received webpage by referring to a conversion table which may be prepared for each of client computers.

Further, this embodiment can make it possible to paraphrase text in a webpage on a client side.

The paraphrase of text in a webpage on a client side allows paraphrase of text that should not be disclosed to entities and persons outside a company. Further, the paraphrase of text in a webpage on a client side ensures privacy or security of paraphrased text, an instantaneous execution of the paraphrase of text, a convenient management of paraphrased text, an efficient paraphrasing task or a combination of these.

Conversion table 391 can be shared with another client, for example, but not limited to, a client for a company, department or another person.

Figure 3B:
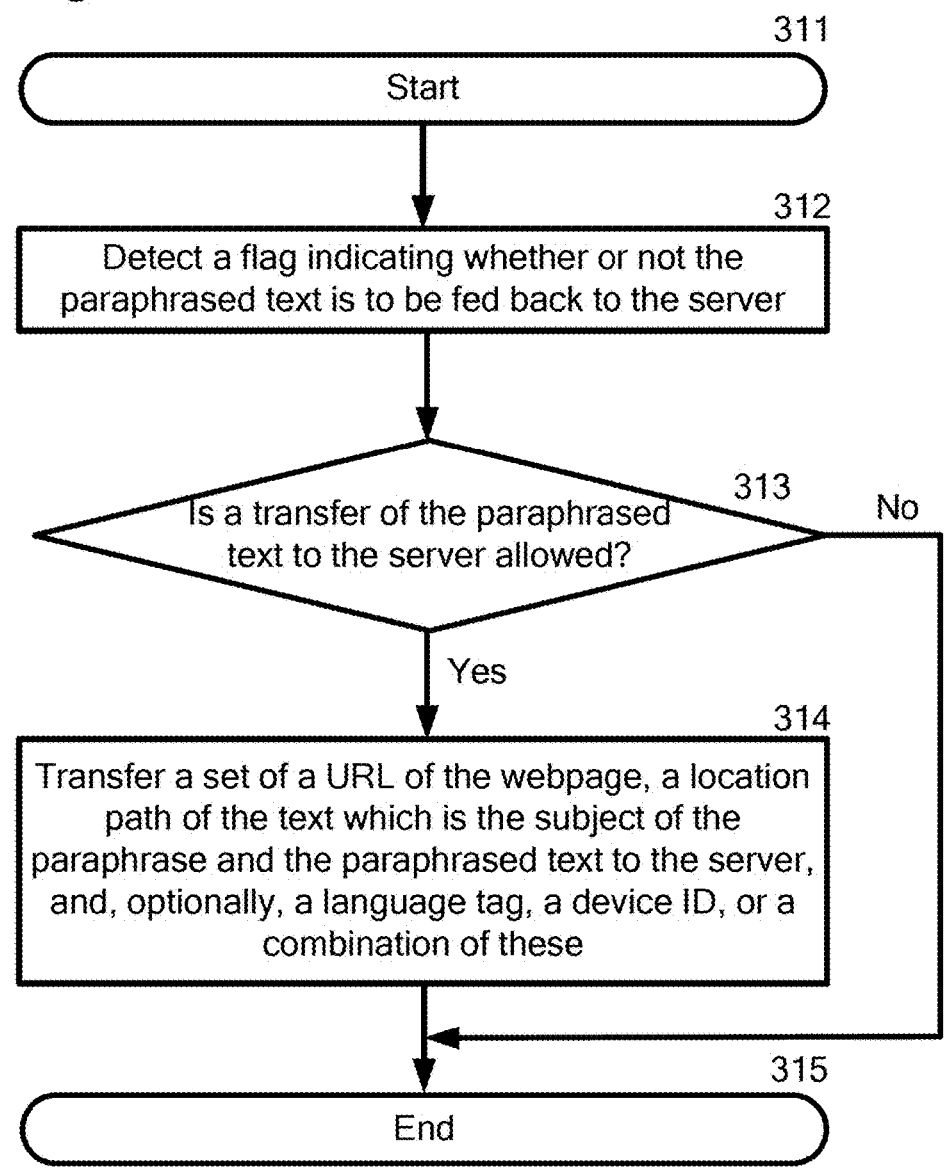
FIG. 3B illustrates one embodiment of a flowchart of a process for feedbacking the paraphrased text from the client computer to the server.

With reference now to FIG. 3B, FIG. 3B illustrates one embodiment of a flowchart of a process for feedbacking the paraphrased text from the client computer to the server.

At step 311, the client starts the process for feedbacking the paraphrased text from the client to the server. This process may start after the paraphrase of text described at step 305 in FIG. 3A.

At step 312, the client detects a flag indicating whether or not the paraphrased text is to be fed back to the server.

At step 313, the client judges whether or not a transfer of the paraphrased text to the server is allowed. If the judgment is positive, the client proceeds to step 314. Meanwhile, if the judgment is negative, the client proceeds to a final step 315.

At step 314, the client transfers a set of URLs of the webpage, a location path of the text that is the subject of the paraphrase, and the paraphrased text and, optionally, a language tag, a device ID, or a combination of these.

The URL of the webpage refers also to a web address of the webpage and is a reference to a web resource that specifies its location on a computer network.

The location path of the text may be represented using, for example, an Xpath.

The paraphrased text may be a subject of paraphrase in a webpage.

The language tag may be represented as, for example, but not limited to, two characters, such as En (i.e. "English"), Jp (i.e. "Japanese"), and Cn (i.e. "Chinese").

The device ID may a unique identifier of a client, for example, but not limited to, a MAC address of a client.

The transferred set can be used for replacing, on the server, text in the webpage with text among the paraphrased text received from each client. The details of the replacement will be explained by referring to FIG. 4 described below.

At step 315, the client terminates the process mentioned above.

According to the embodiment described in FIG. 3B, a result of the paraphrase can be fed back to a server.

Further, a user of the client can choose a feedback option whether the paraphrased text is to be fed back to the server. Accordingly, privacy or security of paraphrased text can be ensured.

With reference now to FIG. 3C, FIG. 3C illustrates one embodiment of a flowchart of a process for deleting, on a client computer, a set comprising the paraphrased text from the conversion table.

At step 321, the client starts the process for deleting, on a client computer, a set comprising the paraphrased text from the conversion table. This process may start after the display of the webpage including the paraphrased text at step 306 described in FIG. 3A or of the received webpage at step 307 described in FIG. 3A. The set in conversion table 391 may comprise a URL of the webpage, a location path of the text which is the subject of the paraphrase, and the paraphrased text and, optionally, a language tag, a device ID, or a combination of these (see FIG. 2C).

At step 322, the client judges whether or not the received webpage has paraphrased text present in conversion table 391. If the judgment is positive, the client proceeds to step 323. Meanwhile, if the judgment is negative, the client proceeds to a final step 324.

At step 323, the client searches for a set comprising the paraphrased text and then deletes, from conversion table 391, this set.

At step 324, the client terminates the process mentioned above.

According to the embodiment described in FIG. 3C, conversion table 391 can be updated automatically (see FIG. 2C).

With reference now to FIG. 3D, FIG. 3D illustrates one embodiment of a flowchart of a process for receiving, from a user of the client computer, text to be further paraphrased that is selected on the displayed webpage and then store it in the conversion table.

At step 331, the client starts the process for receiving, from a user of the client computer, text to be further paraphrased, which is selected on the displayed webpage and then store it in conversion table 391. This process may start after the receipt of the webpage from the server described at step 303 in FIG. 3A.

At step 332, in a case where an edit button on a web application such as a web browser is pressed by a user, the client detects this press. The edit button is implemented by, for example, an extension function (e.g. add-on) of the web application.

At step 333, in a case where text to be further paraphrased is selected by the user on the displayed webpage and a candidate of paraphrased text is input by the user, the client receives the text to be further paraphrased and the input candidate of paraphrased text for the selected text. Further, the client receives, from the user, information on a flag indicating whether or not the paraphrased text is to be fed back to the server.

The selection of the text to be further paraphrased may be made by, for example, selecting a part on the displayed webpage. In response to the selection, a location path of the selected text can be obtained by the client.

The input of the candidate of the displayed webpage may be made by, for example, inputting the candidate into a predefined area.

The input of the flag may be made by, for example, clicking a check box indicating a message to the effect that "Do you participate in improving a quality of a webpage?".

An embodiment of a user interface for selecting text in a webpage and inputting a candidate of paraphrased text will be explained by referring to FIG. 8 described below.

At step 334, the client stores, in conversion table 391, a set of URLs of the webpage, a location path of the selected text and the input candidate and, optionally, a language tag, a flag indicating whether or not the paraphrased text is to be fed back to the server, or a combination of these.

At step 335, the client terminates the process mentioned above.

According to the embodiment described in FIG. 3D, conversion table 391 can be individually updated at a user side.

With reference now to FIG. 4, FIG. 4 illustrates one embodiment of a flowchart of a process for replacing, on the server, text in the webpage with text among the paraphrased text received from each client.

The server 121 described in FIG. 1B performs each of the steps described in FIG. 4.

At step 401, the server starts the process for replacing text in the webpage with text among the paraphrased text received from each client. The server starts this process in response to receipt of the set that was transferred from the client at step 314 described in FIG. 3B.

At step 402, the server receives, from each of the clients, a set of URLs of a webpage, a location path of text that is a subject of paraphrase in the webpage, paraphrased text, and, optionally, a language tag, a device ID, or a combination of these. The server may convert a format of the set and then store the converted set in a management database in order to make an adjustment of a format of each set.

At step 403, the server selects text among the paraphrased text, based on an evaluation function.

The evaluation function may be a majority decision or a weighted majority decision. In the weight majority decision, each of the weighting coefficient for each text is first set to one, or "1", and then a value for each text is obtained.

The weighted majority decision may be a combination of a majority decision and the degree of confidence or time transition.

The degree of confidence may vary depending on a profile including, for example, but not limited to, the following: a result obtained in the past, such as, the degree of contribution of the paraphrase in the previous version or versions; an industry sector of a company; or a scale of a company. For example, in a case where the application and the industry sector agree with each other and the scale or share of the company is larger, the weighting coefficients are increased. In a case where a customer is a personal user, the number of times of commitment to an external technology site (stackoverflow, github, etc.) is used as the profile to determine the weighting coefficients.

The degree of time transition may vary depending on an elapsed time or on the number of appearance times. For example, in a case where the elapsed time is longer, the weighting coefficients are decreased.

At step 404, the server replaces text in the webpage with the selected text. The webpage may be stored in a master resource database where original webpages are stored. The replacement can be made in a case where a value calculated using the evaluation function exceeds a predefined value. Alternatively, a manager of a webpage can instruct the server to start the replacement.

At step 405, the server terminates the process mentioned above.

According to the embodiment described in FIG. 4, the paraphrased text is fed back to the server.

FIGS. 5A to 5C illustrate another embodiment of a flowchart of a process for paraphrasing, on a client computer text in a webpage and its related process.

The client 101 described in FIG. 1A performs each of the steps described in each of FIGS. 5A to 5C.

With reference now to FIG. 5A, FIG. 5A illustrates another embodiment of a flowchart of a process for paraphrasing, on a client computer text in a webpage received from a server, and deleting a set comprising the paraphrased text from the conversion table.

At step 501, the client starts the process for paraphrasing text in a webpage received from a server.

At step 502, the client transfers a request for a webpage including a plurality of passages of text to a server. The request may comprise a URL stored in a conversation table 591 mentioned below. Conversion table 591 may comprise at least one set of a URL of a webpage, a location path of text which is a subject of paraphrase in the webpage, and paraphrased text. The conversation table 591 may be the same as conversation table 391 described in FIG. 3A.

At step 503, the client receives the webpage from the server in response to the request.

At step 504, prior to a display of the received webpage, the client judges whether or not the conversation table 591 has a corresponding record for the received webpage. The judgment is made by referring a URL of the received webpage. If the judgment is positive, the client proceeds to step 505. Meanwhile, if the judgment is negative, the client proceeds to step 509.

At step 505, the client judges whether or not the received webpage has the same value in a set stored in the conversation table 591. The value in the set corresponds to paraphrased text.

At step 506, the client replaces a corresponding text in the webpage with the same value, or paraphrased text, in the set.

At step 507, the client deletes, from the conversation table 591, the set comprising the same value. This is because the webpage was already updated, using the paraphrased text. Accordingly, the set stored in the conversation table 591 is unnecessary any more.

At step 508, the client displays, on a display, the webpage including the paraphrased text instead of displaying the received webpage.

At step 509, the client displays the received webpage on a display.

At step 510, the client terminates the process mentioned above.

With reference now to FIG. 5B, FIG. 5B illustrates another embodiment of a flowchart of a process for receiving, from a user of the client computer, text to be further paraphrased which is selected on the displayed webpage.

At step 511, the client starts the process for receiving, from a user of the client computer, text to be further paraphrased which is selected on the displayed webpage. This process may start after the display of the webpage including the paraphrased text at step 508 described in FIG. 5A or of the received webpage at step 509 described in FIG. 5A.

At step 512, the client displays a web application on which a webpage can be displayed. The webpage displayed on the web application may be the webpage including the paraphrased text at step 508 described in FIG. 5A or the received webpage at step 509 described in FIG. 5A.

At step 513, the client judges whether or not an edit button on a web application such as a web browser has been pressed by a user. If the judgment is positive, the client proceeds to step 514. Meanwhile, if the judgment is negative, the client proceeds to a final step 518.

At step 514, the client enters, on the web application, an edit mode for selecting a portion to be changed and then inputting a candidate of paraphrased text. A user of the client can input a portion to be changed, a candidate of paraphrased text and information on a feedback of the paraphrased text via the web application.

At step 515, the client receives a portion to be changed, and a candidate of paraphrased text instead of the portion, and a flag indicating whether or not the paraphrased text is to be fed back to the server.

At step 516, the client obtains a set of URLs of the webpage, a location path of the text which is the subject of the paraphrase and, optionally, a language tag, a device ID, or a combination of these, using the portion, the candidate and the flag, At step 517, the client stores, into the conversation table 591, information on the URL of the webpage, the location path of the text which is the subject of the paraphrase, the portion to be changed and the flag indicating whether or not the paraphrased text is to be fed back to the server.

At step 518, the client terminates the process mentioned above.

With reference now to FIG. 5C, FIG. 5C illustrates another embodiment of a flowchart of a process for feedbacking the paraphrased text from the client to the server.

At step 521, the client starts the process for feedbacking the paraphrased text from the client to the server. This process may start after the paraphrase of text described at step 506 in FIG. 5A.

At step 522, the client judges whether or not conversion table 591 has been updated. If the judgment is positive, the client proceeds to step 523. Meanwhile, if the judgment is negative, the client proceeds to a final step 525.

At step 523, the client judges whether or not a feedback to the server is possible. The judgment may be made by referring to a flag in each set stored in conversion table 591. Each flag shows whether or not the paraphrased text is to be fed back to the server. If the judgment is positive, the client proceeds to step 524. Meanwhile, if the judgment is negative, the client proceeds to a final step 525.

At step 524, the client transfers a set of URLs of a webpage, a location path of text which is a subject of paraphrase in the webpage, and paraphrased text, and, optionally, a language tag, a device ID, or a combination of these.

The transferred set can be used for replacing, on the server, text in the webpage with text among the paraphrased text received from each client. The details of the replacement will be explained by referring to FIG. 6 described below.

At step 525, the client terminates the process mentioned above.

With reference now to FIG. 6, FIG. 6 illustrates another embodiment of a flowchart of a process for replacing, on the server, text in the webpage with text among the paraphrased text received from each client.

The server 121 described in FIG. 1B performs each of the steps described in FIG. 6.

At step 601, the server starts the process for replacing text in the webpage with text among the paraphrased text received from each client. The server starts this process in response to receipt of the set which was transferred from the client at step 524 described in FIG. 5C.

At step 602, the server receives, from each of the clients, a set of URLs of a webpage, a location path of text that is a subject of paraphrase in the webpage, paraphrased text, and, optionally, a language tag, a device ID, or a combination of these.

At step 603, the server converts a format of the set and then stores the converted set in a management database 692 in order to make an adjustment of a format of each set.

At step 604, the server obtains a value to be updated, or text among the paraphrased text in the set stored in the management database 692.

At step 605, the server judges whether or not text in the set need to be updated. The judgment may be made using the evaluation function. The evaluation function may be the same as that at step 403 described in FIG. 4. If the judgment is positive or a value calculated using the evaluation function exceeds a predefined value, the client proceeds to step 606. Meanwhile, if the judgment is negative or a value calculated using the evaluation function does not exceed a predefined value, the client proceeds to a final step 607.

At step 604, the server replaces text in the webpage with the text in the set to update text in a webpage stored in a master resource database 593.

At step 605, the server terminates the process mentioned above.

Figure 7A:
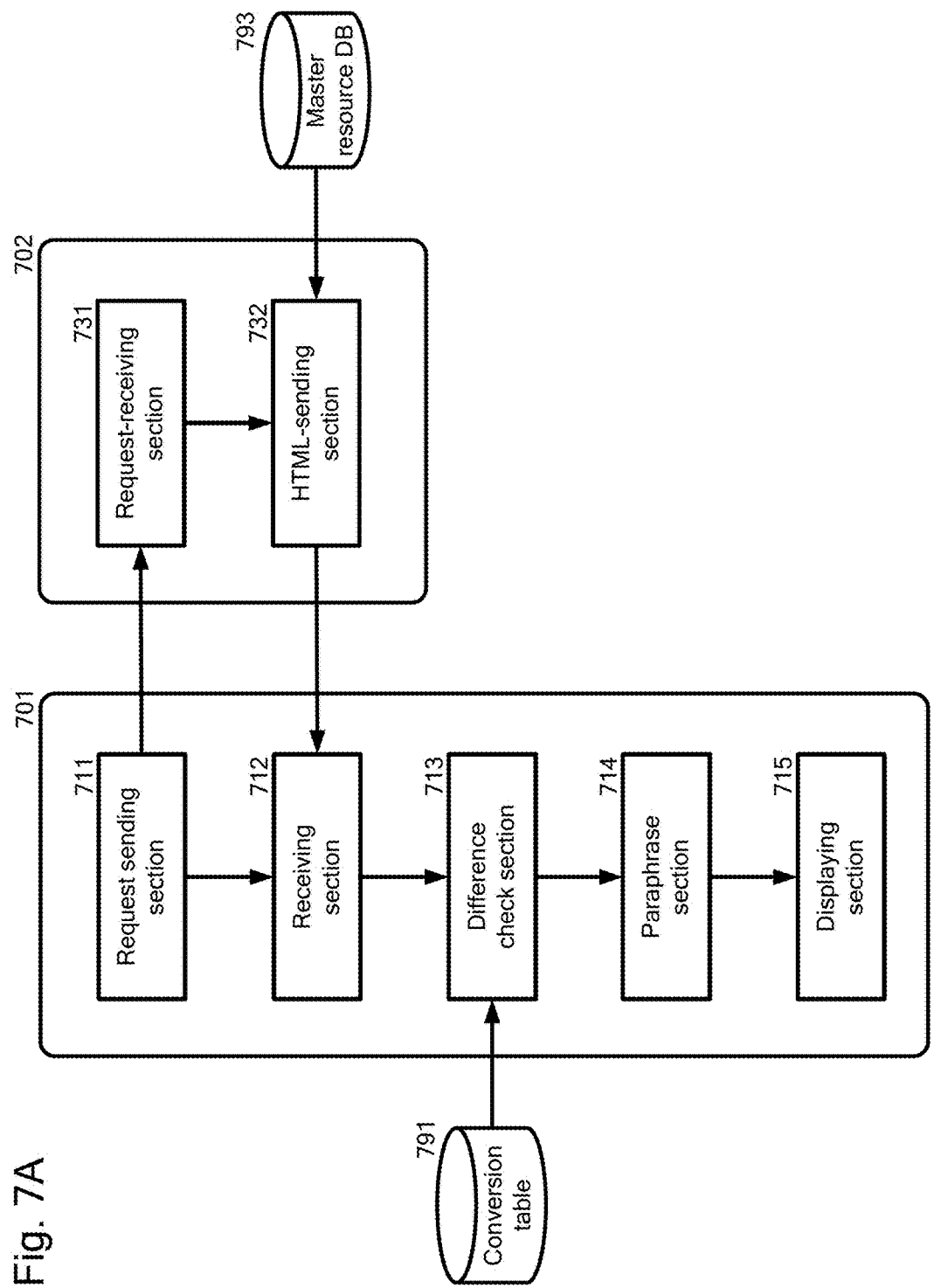
FIG. 7A illustrates an embodiment of an overall functional block diagram of a client computer and a server, both of which are used in accordance with the embodiment of the flowchart described in FIG. 3A and FIGS. 5A and 5B.
Figure 7C:
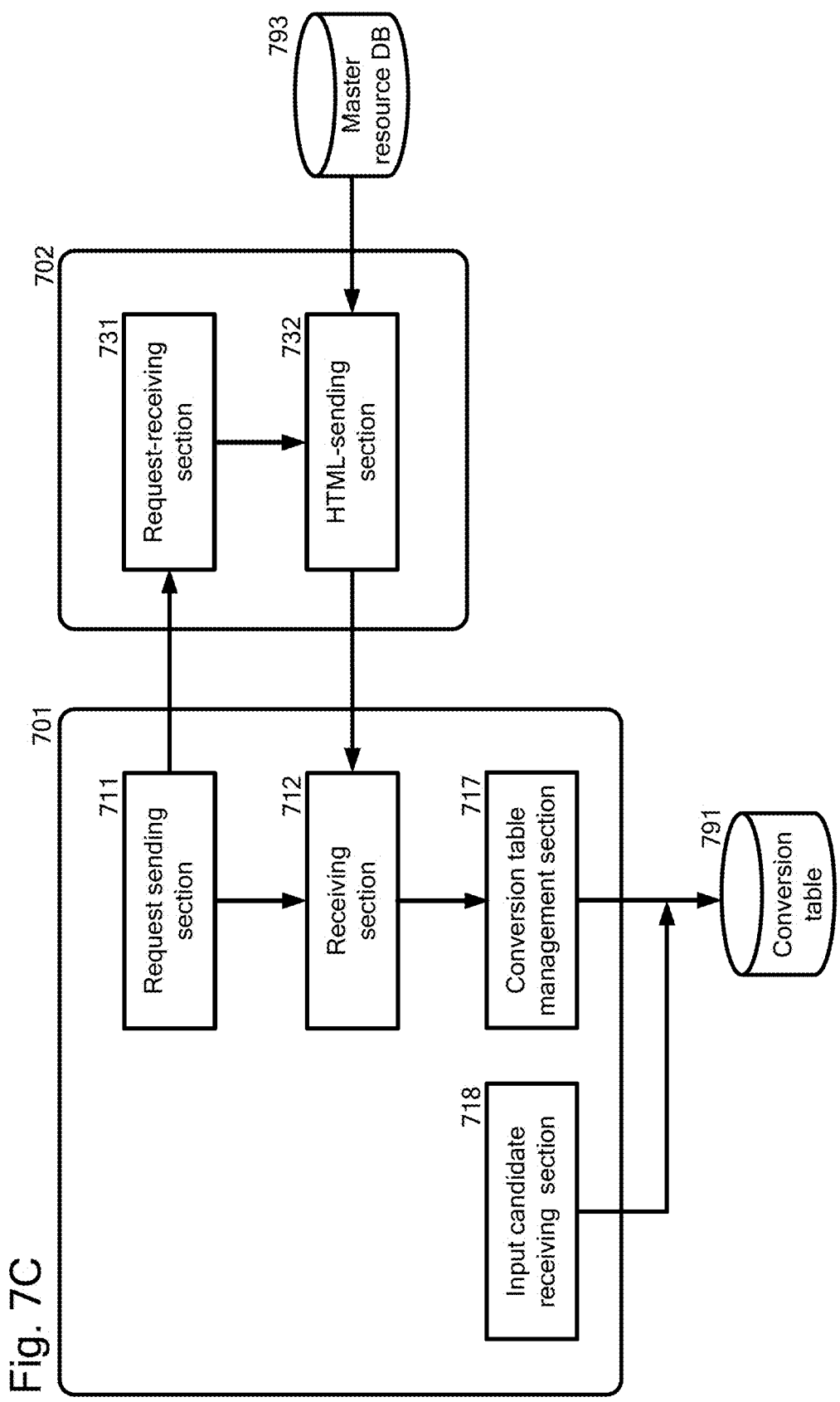
FIG. 7C illustrates an embodiment of an overall functional block diagram of a client computer and a server, both of which are used in accordance with the embodiment of the flowchart described in FIGS. 3C and 3D and FIG. 5B.

FIGS. 7A to 7C illustrate an embodiment of an overall functional block diagram of a system A client 701 may correspond to client 101 described in FIG. 1A. A server 702 may correspond to server 121 described in FIG. 1B.

With reference now to FIG. 7A, FIG. 7A illustrates an embodiment of an overall functional block diagram of client 701 and server 702, both of which are used in accordance with the embodiment of the flowchart described in FIG. 3A and FIGS. 5A and 5B.

Client 701 may comprise a request sending section 711, a receiving section 712, a difference check section 713, a paraphrase section 714 and a displaying section 715.

The request sending section 711 may transfer a request for a webpage including a plurality of passages of text to server 702.

The request sending section 711 may perform step 302 described in FIG. 3A and step 502 described in FIG. 5A.

The receiving section 712 may receive the webpage from server 702 in response to the request;

The receiving section 712 may perform step 303 described in FIG. 3A and step 503 described in FIG. 5A.

The difference check section 713 may judge whether or not the received webpage has text which is a subject of paraphrase, for example, using a conversion table 791.

The difference check section 713 may perform step 304 described in FIG. 3A and steps 504 and 505 described in FIG. 5A.

The paraphrase section 714 may paraphrase the text, for example, using the conversion table 791, in a case where the judgment is positive.

The paraphrase section 714 may perform step 305 described in FIG. 3A and step 506 described in FIG. 5A.

The displaying section 715 may display, on a display, the webpage including the paraphrased text instead of the received webpage or display, on the display, the received webpage.

The displaying section 715 may perform steps 306 and 305 described in FIG. 3A, steps 508 and 509 described in FIG. 5A, and step 512 described in FIG. 5B.

Server 702 may comprise a request-receiving section 731 and an HTML-sending section 732.

The request-receiving section 731 may search for a requested webpage or HTML.

The request-receiving section 731 may perform step 402 described in FIG. 4.

The HTML-sending section 732 may send the requested webpage to client 701.

With reference now to FIG. 7B, FIG. 7B illustrates an embodiment of an overall functional block diagram of client 701 and server 702, both of which are used in accordance with the embodiment of the flowchart described in FIGS. 3B and 4 and FIGS. 5C and 6.

Client 701 may further comprise a feedback section 716.

The feedback section 716 may detect a flag indicating whether or not the paraphrased text is to be fed back to server 702; and then, in a response to the detection, transfer a set of URLs of the webpage, a location path of the text which is the subject of the paraphrase, and the paraphrased text to server 702.

The feedback section 716 may perform steps 312 to 314 described in FIG. 3B and steps 522 to 524 described in FIG. 5C.

Server 702 may further comprise paraphrased text selecting section 733 and a replacing section 734.

The paraphrased text selecting section 733 may receive, from each of the clients, a set of URLs of a webpage, a location path of text which is a subject of paraphrase in the webpage, and paraphrased text and then select text among the received tests, based on an evaluation function.

The paraphrased text selecting section 733 may perform step 403 described in FIG. 4 and steps 602 to 604 described in FIG. 6.

The replacing section 734 may replace text in the webpage stored in a master resource database 793 with text among the received text. The set may be stored in a change management database 792.

The replacing section 734 may perform step 404 described in FIG. 4 and steps 605 to 606 described in FIG. 6.

With reference now to FIG. 7C, FIG. 7C illustrates an embodiment of an overall functional block diagram of client 701 and server 702, both of which are used in accordance with the embodiment of the flowchart described in FIGS. 3C and 3D and FIG. 5B.

Client 701 may comprise the request sending section 711 and the receiving section 712, both of which are already mentioned in FIG. 7A, and further comprise a conversion table management section 717 and an input candidate receiving section 718.

The conversion table management section 717 may judge whether or not the received webpage has paraphrased text present in the conversion table 791, in response to receipt of the webpage and then, in a case where the judgment is positive, delete, from the conversion table 791, a set comprising the paraphrased text.

The conversion table management section 717 may perform steps 322 and 323 described in FIG. 3C and steps 513 to 517 described in FIG. 5B.

The input candidate receiving section 718 may receive, from a user, text to be further paraphrased that is selected on the displayed webpage and an input candidate of paraphrased text for the selected text; and then store, in the conversion table 791, a set of URLs of the webpage, a location path of the selected text and the input candidate in response to the receipt.

The input candidate receiving section 718 may perform steps 513.

Server 702 may comprise the request-receiving section 731 and then HTML-sending section 732, both of which are already mentioned in FIG. 7A.

The input candidate receiving section 718 may perform steps 332 to 334 described in FIG. 3D.

With reference now to FIG. 8, FIG. 8 illustrates an embodiment of a user interface for selecting text in a webpage and inputting a candidate of paraphrased text.

In a case where an edit button on a web application such as a web browser is pressed by a user of a client computer, the client detects this press, as seen at step 332 described in FIG. 3D.

The client moves an edit mode for selecting text in a webpage and inputting a candidate of paraphrased text.

A screen 801 displays a window after moving the edit mode. The screen 801 has a window 811 for displaying a webpage just before pressing the edit button, and a checkbox 813 indicating a message for allowing the client to feedback paraphrased text to a server, for example, "Do you feedback your paraphrased text?".

A user of the client can select text in the window 811, using, for example, a mouse or screen touch. The screen 801 shows that the text "Hello" was selected by the user.

In response to the selection of the text, the client may display a new window 822 for inputting a candidate of paraphrased text, as seen in a screen 802.

The user can input the candidate in the window 822. The screen 802 shows that the candidate, "Welcome", was input in the window 822 by the user. In a case where the user acknowledge the candidate, the user may press a button, "OK", in the window 822.

In response to the detection of the button, "OK", the client updates a source of the webpage and further a conversion table. Further, the client may update the window 821 corresponding to the window 811 in order to show the window in which the selected text was replaced with the candidate.

Further, the user may click the check box 823 for allowing a feedback of the paraphrased text to the server.

The source of the webpage is updated as follows:
The source of the webpage before the update:

```
<html>
<body>
<p>Hello</p>
<p>Latest news</p>
</body>
</html>
```

The source of the webpage after the update:

```
<html>
<body>
<p>Welcome</p>
<p>Latest news</p>
</body>
</html>
```

The screen 803 displays a window 831 after the update of the webpage.

Further, the user may click the check box 833 for allowing a feedback of the paraphrased text to the server.

In a case where the check box 833 was checked, the client can feedback the paraphrased text to the server, according to the flowchart described in FIG. 5C.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information on the computer readable program instructions to personalize the electronic circuitry, in order to perform aspects of the present invention.

Aspects of the present invention are described herein with reference to flowchart illustrations and/or block diagrams. These process flowcharts illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for paraphrasing, on a client computer, text in a webpage, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for paraphrasing text in a webpage. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for paraphrasing, on a client computer, text in a webpage. In this case, a computer infrastructure, such as client 101 (FIG. 1A) and/or server 12 (FIG. 1B), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as client 101 (FIG. 1A) and/or server 121 (FIG. 1B), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, the teachings of the present invention may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

It is apparent that there has been provided approaches for paraphrasing, on a client computer, text in a webpage. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for customizing textual content of a webpage, the method comprising:
   transferring a request from a client computer for the webpage that includes a plurality of passages of text to a server;
   receiving the webpage from the server in response to the request, the webpage being an original webpage managed by the server that has had any text in the webpage that was included in an entry specific to the client in a server-based conversion table paraphrased;
   searching a client-based conversion table to determine whether the received webpage has text which is included in the client-based conversion table as a subject of paraphrase;
   in a case where the determination is positive, paraphrasing the text using the client-based conversion table;
   displaying, on a display, the webpage including the paraphrased text;
   detecting, in response to a determination that the webpage has text which is included in the client-based conversion table as a subject of paraphrase, a flag indicating whether the paraphrased text in the client-based conversion table is public text to be fed back to the server; and
   in a response to the detection of the flag, transferring a set of URLs of the webpage, a location path of the text which is the subject of the paraphrase, and the paraphrased text to the server-based conversion table.

2. The method according to claim 1, wherein the location path is an XPath or a location ID.

3. The method according to claim 1, wherein the client-based conversion table comprises at least one of a URL of a webpage, a location path of text which is a subject of paraphrase in the webpage, and paraphrased text.

4. The method according to claim 3, further comprising:
   deleting, in response to a determination that paraphrased text in the client-based conversion table has been replaced by the server in the webpage received from the server, a set comprising the paraphrased text from the client-based conversion table.

5. The method according to claim 4, further comprising:
   receiving, from a user of the client computer, text to be further paraphrased which is selected on the displayed webpage and an input candidate of paraphrased text for the selected text; and
   storing, in the client-based conversion table, a set of URLs of the webpage, a location path of the selected text and the input candidate in response to the receipt.

6. The method according to claim 5, wherein the set further comprises a flag indicating whether the paraphrased text is to be fed back to the server.

7. The method according to claim 1, wherein the paraphrasing is at least one of a substitution within one language or a substitution between different languages.

8. The method according to claim 1, further comprising:
   updating the text in the webpage on the server, by:
   receiving, from each of a set of client computers, which includes the client computer, the set of URLs of the webpage, the location path of the text which is the subject of the paraphrase in the webpage, and the paraphrased text; and
   replacing the text in the webpage with the paraphrased text from a selected one of the set of client computers.

9. The method according to claim 8, wherein the paraphrased text is selected based on at least one of a majority decision or a weighted majority decision, which is a combination of a majority decision and at least one of a degree of confidence or a time transition.

10. A system for customizing textual content of a webpage, comprising:
    a memory storing a program; and
    a processor configured to execute the program to perform an operation for paraphrasing text in a webpage, the operation comprising:
    transferring a request from a client computer for the a webpage that includes a plurality of passages of text from a client computer to a server;
    receiving the webpage from the server in response to the request, the webpage being an original webpage managed by the server that has had any text in the webpage that was included in an entry specific to the client in a server-based conversion table paraphrased;
    searching a client-based conversion table to determine whether the received webpage has text which is included in the client-based conversion table as a subject of paraphrase;
    in a case where the determination is positive, paraphrasing the text using the client-based conversion table;
    displaying, on a display, the webpage including the paraphrased text;
    detecting, in response to a determination that the webpage has text which is included in the client-based conversion table as a subject of paraphrase, a flag indicating whether the paraphrased text in the client-based conversion table is public text to be fed back to the server; and
    in a response to the detection of the flag, transferring a set of URLs of the webpage, a location path of the text which is the subject of the paraphrase, and the paraphrased text to the server-based conversion table.

11. The system according to claim 10, the operation further comprising:

receiving, from a user of the client computer, text to be further paraphrased which is selected on the displayed webpage and an input candidate of paraphrased text for the selected text; and storing, in the client-based conversion table, a set of URLs of the webpage, a location path of the selected text and the input candidate in response to the receipt.

12. The system according to claim 10, the operation further comprising:

updating the text in the webpage on the server, by:

receiving, from each of a set of client computers, which includes the client computer, the set of URLs of the webpage, the location path of the text which is the subject of the paraphrase in the webpage, and the paraphrased text; and replacing the text in the webpage with the paraphrased text from a selected one of the set of client computers.

13. The system according to claim 12, wherein the paraphrased text is selected based on at least one of a majority decision or a weighted majority decision, which is a combination of a majority decision and at least one of a degree of confidence or a time transition.

14. A computer program product for customizing textual content of a webpage, the computer program product comprising a computer readable storage medium having program instructions embodied therewith, the program instructions executable by a processor to cause a client computer to perform a method comprising:

transferring a request from a client computer for the a webpage including plurality of passages of text to a server;

receiving the webpage from the server in response to the request, the webpage being an original webpage managed by the server that has had any text in the webpage that was included in an entry specific to the client in a server-based conversion table paraphrased;

searching a client-based conversion table to determine whether the received webpage has text which is included in the client-based conversion table as a subject of paraphrase;

in a case where the determination is positive, paraphrasing the text using the client-based conversion table;

displaying, on a display, the webpage including the paraphrased text;

detecting, in response to a determination that the webpage has text which is included in the client-based conversion table as a subject of paraphrase, a flag indicating whether the paraphrased text in the client-based conversion table is public text to be fed back to the server; and in a response to the detection of the flag, transferring a set of URLs of the webpage, a location path of the text which is the subject of the paraphrase, and the paraphrased text to the server-based conversion table.

15. The program product according to claim 14, the method further comprising:

receiving, from a user of the client computer, text to be further paraphrased which is selected on the displayed webpage and an input candidate of paraphrased text for the selected text; and storing, in the client-based conversion table, a set of URLs of the webpage, a location path of the selected text and the input candidate in response to the receipt.

16. The program product according to claim 14, the method further comprising:

updating the text in the webpage on the server, by:

receiving, from each of a set of client computers, which includes the client computer, the set of URLs of the webpage, the location path of the text which is the subject of the paraphrase in the webpage, and the paraphrased text; and replacing the text in the webpage with the paraphrased text from a selected one of the set of client computers.

17. The program product according to claim 16, wherein the paraphrased text is selected based on at least one of a majority decision or a weighted majority decision, which is a combination of a majority decision and at least one of a degree of confidence or a time transition.

* * * * *